United States Patent [19]
Ichihara

[11] Patent Number: 5,623,473
[45] Date of Patent: Apr. 22, 1997

[54] METHOD AND APPARATUS FOR MANUFACTURING A DIFFRACTION GRATING ZONE PLATE

[75] Inventor: Yutaka Ichihara, Yokohama, Japan

[73] Assignee: Nikon Corporation, Japan

[21] Appl. No.: 496,554

[22] Filed: Jun. 29, 1995

[30] Foreign Application Priority Data

Jun. 30, 1994 [JP] Japan .................................. 6-170372
Jun. 30, 1994 [JP] Japan .................................. 6-170373

[51] Int. Cl.$^6$ ..................................................... G02B 5/18
[52] U.S. Cl. .......................... 369/116; 369/112; 430/321; 359/566
[58] Field of Search .................................. 369/116, 112; 430/321, 299; 359/575, 566

[56] References Cited

U.S. PATENT DOCUMENTS

| | | | |
|---|---|---|---|
| 4,403,827 | 9/1983 | Bryan et al. | 359/575 |
| 4,530,736 | 7/1985 | Mutter | 430/321 |
| 4,660,934 | 4/1987 | Akiba et al. | 430/299 |
| 4,895,790 | 1/1990 | Swanson et al. | 430/321 |
| 4,936,665 | 6/1990 | Whitney | 359/565 |
| 5,016,951 | 5/1991 | Deason et al. | 430/321 |
| 5,101,297 | 3/1992 | Yoshida et al. | 430/321 |
| 5,114,513 | 5/1992 | Hosokawa et al. | 430/321 |
| 5,148,314 | 9/1992 | Chen | 359/642 |
| 5,156,943 | 10/1992 | Whitney | 430/321 |
| 5,161,059 | 11/1992 | Swanson et al. | 359/565 |
| 5,218,471 | 6/1993 | Swanson et al. | 359/565 |
| 5,229,880 | 7/1993 | Spencer et al. | 359/353 |
| 5,238,785 | 8/1993 | Ohkura et al. | 430/321 |
| 5,252,434 | 10/1993 | Blonder | 430/323 |
| 5,257,133 | 10/1993 | Chen | 359/565 |
| 5,278,028 | 1/1994 | Hadimioglu et al. | 430/321 |
| 5,287,218 | 2/1994 | Chen | 359/365 |
| 5,368,992 | 11/1994 | Kunitsugu | 430/321 |

FOREIGN PATENT DOCUMENTS

| | | |
|---|---|---|
| 0312341 | 4/1989 | European Pat. Off. . |
| 4-214516 | 8/1992 | Japan . |
| 4-361201 | 12/1992 | Japan . |
| 5-150108 | 6/1993 | Japan . |
| 5-150107 | 6/1993 | Japan . |
| 5-297471 | 11/1993 | Japan . |
| 5-297209 | 11/1993 | Japan . |
| 6-138415 | 5/1994 | Japan . |
| 6-194509 | 7/1994 | Japan . |
| 6-194571 | 7/1994 | Japan . |
| 6-186504 | 7/1994 | Japan . |
| 6-222208 | 8/1994 | Japan . |
| 6-331942 | 12/1994 | Japan . |
| 6-331941 | 12/1994 | Japan . |

*Primary Examiner*—Georgia Y. Epps
*Assistant Examiner*—Kim-Kwok Chu
*Attorney, Agent, or Firm*—Pennie & Edmonds

[57] ABSTRACT

An apparatus of this invention has an objective lens for guiding an exposure beam emitted by a light source toward a first region on a rotary table, a lighting light source for irradiating lighting light in the direction of the first region via the objective lens, an image pickup device for picking up an image from the first region obtained via the objective lens, modulation means for changing the propagating direction of the exposure beam, and a controller for controlling the modulation means on the basis of a signal input from the image pickup device.

26 Claims, 24 Drawing Sheets

ULTRA SONIC WAVE

ULTRA SONIC WAVE

ATOMS

ULTRA SONIC WAVE (a)

(b)

(c)

METHOD AND APPARATUS FOR MANUFACTURING A DIFFRACTION GRATING ZONE PLATE

BACKGROUND OF THE INVENTION

1. Field of the Invention

The present invention relates to a method and apparatus for manufacturing a diffraction optical element such as a zone plate, binary optics, or the like.

2. Description of the Related Art

In recent years, a so-called diffraction optical element has received a lot of attention as an optical element used in a projection exposure apparatus or the like. The diffraction optical element deflects an optical path by utilizing a diffraction effect. The diffraction optical element can arbitrarily deflect the optical path of a light beam of a short wavelength, and exhibits wavelength-deflection characteristics different from those of a refraction lens. For this reason, an application such as a new aberration correction member upon combination with a refraction lens is expected.

As the diffraction optical element, a so-called zone plate is known. As the zone plate, a Fresnel zone plate which has a structure constituted by arranging concentric circular light-shielding members on a light-transmitting substrate, as shown in FIGS. 4A and 4B, is known. Also, a so-called binary optics (BOE) in which concentric circular regions with different transmission characteristics (refractive indices, transmission distances, and the like) are arranged stepwise (to have a staircase sectional shape) to locally vary the transmission distance of a light beam incident on the element, so as to obtain a diffraction effect, is proposed as a new zone plate.

Such an optical element is described in U.S. Pat. Nos. 5,156,943 and 4,895,790. Apparatuses described in these patents cannot manufacture a diffraction optical element with a precision pattern.

SUMMARY OF THE INVENTION

It is an object of the present invention to provide a method of manufacturing a diffraction optical element having a pattern with higher precision than that manufactured by the conventional apparatus, and an apparatus for manufacturing the diffraction optical element.

The manufacturing process (method) of a zone plate used so far by the present inventors will be briefly described below with reference to FIGS. 5A to 5D. FIG. 5A shows the section of a state wherein a concentric circular pattern is formed in the first exposure (hatched portions are removed portions). The concentric circular pattern is formed by the following processes.

A substrate coated with a photoresist is placed on a rotary stage, and the rotary stage is rotated while a laser beam is focused and irradiated onto a desired position on the substrate as a small spot using an objective lens. Since the substrate rotates upon rotation of the rotary stage, the focused light spot formed on the substrate irradiates the substrate to draw an annular shape to have the center of rotation as the center.

The photoresist of the portion, irradiated with the laser beam, on the substrate is exposed in an annular shape, and an annular pattern can be obtained by subsequent treatments such as development, etching, and the like. At this time, when the focusing position of the small spot is moved in the radial direction, an annular pattern region having a line width larger than the focused light spot width can be formed.

After one annular exposure region is formed, the exposure is stopped, and the focusing position of the small spot is moved by a predetermined amount in the radial direction of the exposure region. The exposure is started again and the rotary stage is rotated. Thus, a new annular exposure region (with a concentric circular shape) having the same center as but a different diameter from the above-mentioned annular exposure region is formed.

At this time, by precisely monitoring the focusing position of the small spot using a laser distance measuring unit, a high-precision concentric circular pattern is obtained. Of course, the width of the new annular exposure region can also be adjusted depending on the moving distance of the focusing position of the small spot.

Such an operation is repeated a plurality of number of times to form a plurality of concentric circular exposure regions. Thereafter, the substrate is subjected to a predetermined development treatment, or the like, and is also subjected to a process such as etching, as needed, thus obtaining a zone plate formed with a pattern defined by a transmission region with steps depending on the presence/absence of the etching process, as shown in FIG. 5B. FIG. 5B shows regions to be removed by etching after the second exposure is performed on the zone plate formed with a three-dimensional section by the first exposure.

More specifically, a photoresist is coated on the zone plate formed with the three-dimensional section by the first exposure, and annular exposure regions having a smaller width are formed on both portions with and without the pattern. Thereafter, the zone plate is subjected to processes such as development, etching, and the like, thus obtaining a zone plate with a doubled number of steps, as shown in FIG. 5C. FIG. 5C shows a state wherein a photoresist is coated on the zone plate which is subjected to the second exposure and the etching treatment, and the third exposure, and the like are performed on the zone plate.

In this manner, when the process of forming concentric circular exposure regions and performing etching is repeated a plurality of number of times, a zone plate (BOE) with a structure constituted by a plurality of steps of transmission regions (i.e., having a staircase sectional shape) is obtained.

In the above description, a zone plate (BOE) which is formed to have a staircase section by etching a substrate has been exemplified. Of course, a zone plate (BOE) which is formed to have a staircase section by stacking annular thin films, as shown in FIGS. 6A to 6C, has also been proposed. To obtain this zone plate, a thin film layer is formed between a photoresist and a substrate, the photoresist is exposed in a concentric circular pattern, and a thin film layer present on a region other than the exposure region is removed by etching. By repeating this process, a concentric circular pattern is formed.

As described above, in order to form the staircase section of the BOE, the exposure process for exposing a substrate in correspondence with a concentric circular pattern, and the etching process for performing a development, etching treatment, and the like of the substrate which is detached from the rotary stage must be repetitively performed a plurality of number of times.

At this time, in the second and subsequent exposure processes, when the substrate is not precisely placed at the same position as in the first process, the second and subsequent exposed patterns are shifted from the previously formed three-dimensional pattern.

When the concentric circular patterns are exposed at shifted positions, the staircase pattern of a zone plate (BOE) obtained by subsequent etching does not have a desired shape. Such a zone plate suffers the following problems: low diffraction efficiency, an increase in scattered light and stray light, generation of wavefront aberration, and the like.

In order to prevent shifts of the exposure position, the following method is disclosed in Japanese Patent Laid-Open No. 5-165222. That is, any position shift between the center of the substrate and the center of rotation is detected as decentering information, and the irradiation position of the focused light spot upon exposure is decentered on the basis of the decentering information. In this method, a reference ring is formed in addition to a concentric circular pattern, and other concentric circular patterns are aligned to the reference ring.

However, with this method, a small position shift of the decentering information influences the exposure region, and precise concentric circular patterns cannot be formed. This problem is posed under the influences of expansion/contraction of a substrate, the decentering tolerance and rotation angle detection error of the rotary stage, a time error upon feedback of such information, and the like.

In particular, when a staircase pattern as one diffraction pattern of a BOE is to be formed, a plurality of exposure regions must be formed on and adjacent to the already formed patterns. However, with the above-mentioned conventional techniques, a very small shift is formed between these patterns, and a staircase overlapping pattern cannot be precisely formed. As a result, the designed diffraction effect cannot be obtained.

In order to solve the above-mentioned problems, and to manufacture a diffraction optical element with a precision pattern, the present invention is applied to a method and apparatus, in which an exposure beam emitted by a light source is irradiated onto a resist coated on a transparent substrate arranged on a rotary table to form a concentric circular pattern on the resist. The rotary table is rotated by a motor.

This apparatus comprises an objective lens, a lighting light source, an image pickup device, modulation means, and a control device.

An exposure beam emitted by the light source is transmitted through the objective lens, and is guided toward a first region on the rotary table. Since a transparent substrate coated with a resist is placed on the rotary table, the exposure beam is focused on the resist by the objective lens, and the portion irradiated with the exposure beam on the resist is exposed.

On the other hand, another light is irradiated onto the resist via the objective lens. This light is lighting light emitted by the lighting light source. More specifically, the lighting light source irradiates lighting light toward the first region on the rotary table via the objective lens. Therefore, the portion irradiated with the exposure beam on the resist is also irradiated with the lighting light.

The resist is coated on a transparent substrate on which a diffraction grating has already been formed. An image of the diffraction grating on the transparent substrate is obtained by irradiating lighting light thereto, and the image obtained from the first region is imaged on the image pickup device via the objective lens. The image pickup device comprises an image pickup element such as a CCD. The diffraction grating is constituted by a plurality of step portions on the transparent substrate.

More specifically, the image picked up by the image pickup device is an image of the edge of the step portion formed on the rear surface of the transparent substrate. The control device controls the modulation means to irradiate an exposure beam onto a portion coated with the resist on a predetermined region of the transparent substrate adjacent to the edge.

This apparatus further comprises a memory for storing the position of the edge calculated by a position detector. This memory accumulates the output from the position detector during an interval from time $2\pi/\omega$ (sec) to time $4\pi/\omega$ (sec). An AOM controller controls an acoustooptic modulator to irradiate an exposure beam at a position obtained by adding half the diameter of the exposure beam to the data of the edge position accumulated on the memory during a time interval from time $2(n+1)\pi/\omega$ (sec) to $2(n+2)\pi/\omega$ (sec).

Note that $\omega$ is the rotational speed (rad/sec) of the rotary table, $\pi$ is the ratio of circumference of circle to its diameter, and n is an integer.

In the method of the present invention, in the first step, a concentric circular diffraction grating constituted by a plurality of step portions is formed on the surface of a transparent substrate. In the second step, a resist is coated on the diffraction grating. In the third step, the edge of the step portion of the transparent substrate is observed by the image pickup device via the resist while rotating the transparent substrate. In the fourth step, the position of this edge is calculated based on the output from the image pickup device. In the fifth step, an exposure beam is irradiated onto a portion, on a region adjacent to the edge position, on the resist, while rotating the transparent substrate. With this method, since the exposure beam is irradiated onto the region adjacent to the edge after the edge position is detected, a diffraction optical element with a precision pattern can be consequently manufactured.

In order to manufacture a diffraction optical element with a precision pattern, the apparatus of the present invention comprises an element for limiting the effective diameter of the exposure beam.

Since the intensity of the exposure beam roughly has a Gaussian spatial distribution, the beam intensity becomes weaker toward the periphery from the center of the beam. Note that the exposure beam in the effective diameter has a sufficient intensity for exposing the resist.

When the effective diameter of the exposure beam is $R_0$, and a region of $2R_0$ is to be exposed, a half of this region is again exposed by the exposure beam having the effective diameter $R_0$, and thereafter, the remaining half region is exposed by the exposure beam having the effective diameter $R_0$. However, when a region of $1.1R_0$ is to be exposed, a portion of the region is exposed by the exposure beam having the effective diameter $R_0$, and thereafter, the remaining region is exposed by the exposure beam having the effective diameter $R_0$ to overlap a region of $0.9R_0$ with the exposure region, thus exposing the region of $1.1R_0$. However, it is impossible to achieve this. Since the irradiation positions of the exposure beam overlap each other, a region outside the effective diameter, which is not exposed by the single exposure, is undesirably exposed. Since the intensity distribution of the exposure beam is a substantially Gaussian distribution, light components outside the effective diameter of the exposure beam influence the resolution.

In view of this problem, the apparatus of the present invention comprises the element for limiting the effective diameter of the beam, and a beam expander.

The beam expander is arranged on the optical path of the exposure beam which propagates from the light source to the objective lens, and expands the diameter of the exposure beam incident thereon.

The element for limiting the effective diameter of the exposure beam is arranged on the optical path of the exposure beam which propagates from the beam expander to the objective lens, and has an aperture whose size can be changed. The exposure beam passes the aperture stop of this element. Since the aperture limits the effective diameter of the exposure beam, a precision pattern can be projected onto the resist by adjusting the size of the aperture in correspondence with a region to be exposed.

The present invention provides a method of manufacturing a zone plate on which a diffraction pattern having a staircase section is formed exposing different concentric circular patterns on a substrate to overlap each other, characterized in that in second and subsequent superpose exposure processes, the position of the previously formed pattern is detected, and alignment for exposure is performed on the basis of the detected position information.

The apparatus of the present invention relates to a zone plate manufacturing apparatus, which forms an annular exposure region on an object to be worked by exposing the object to be worked which is being rotated, and performs an exposure process at a different position by moving the exposure position on the object to be worked so as to form concentric circular patterns on the object to be worked.

The present invention provides an apparatus comprising a rotary table on which an object to be worked is placed, exposure means for focusing and irradiating predetermined exposure light onto the surface of the object to be worked, moving means for moving the exposure position by the exposure means at least in a direction perpendicular to the central axis of rotation of the rotary table, pattern position detection means for detecting the positions of concentric circular patterns formed on the object to be worked, and control means for determining an exposure region on the object to be worked on the basis of the pattern position information detected by the pattern position detection means, and controlling the moving means to move the exposure position so as to irradiate the exposure light into the determined exposure region.

Furthermore, this zone plate manufacturing apparatus further comprises memory means for storing a working region determined by the diameter and the width, in the radial direction, of a concentric circular pattern to be formed on an object to be worked. The control means detects the diameter of the pattern on the basis of the pattern position information detected by the pattern position detection means, selects working region information of a pattern to be formed at the position of the detected pattern diameter from the memory means, and moves the exposure position by the selected width from the edge position of the detected pattern on the basis of the selected information.

In this zone plate manufacturing apparatus, the pattern position detection means comprises non-contact type position detection means which uses a light beam, which substantially does not influence a photosensitive member formed on the object to be worked, as inspection light.

Furthermore, in this zone plate manufacturing apparatus, the pattern position detection means detects the position of the pattern by irradiating the inspection light onto the object to be worked and detecting light scattered by the edge portion of the pattern formed on the object to be worked.

The present invention relates to a zone plate manufacturing method which forms concentric circular patterns on an object to be worked by forming annular exposure regions on the object to be worked by exposing the object to be worked, which is being rotated, and performing exposure processes at different positions by moving the exposure position on the object to be worked.

In such a zone plate manufacturing method, it is important to prevent a shift from the previously formed pattern upon second and subsequent superpose exposure processes. Therefore, the present invention proposes a method of obtaining a zone plate free from a pattern shift by performing the next exposure process with reference to the previously formed pattern.

On the pattern formed on the surface of the object to be worked, each pattern region is distinguished from a neighboring pattern region by a step. Each of the second and subsequent exposure processes is performed to determine a cutting region for obtaining a staircase pattern by cutting the edge portion of each pattern region in turn, and this cutting region is an annular region always having a width separated by a predetermined distance from the edge portion.

The present invention pays attention to the exposure region from this edge portion, i.e., detects the edge portion of each pattern region and performs exposure by a predetermined distance (the width of the annular exposure region) from the detected edge, thereby obtaining a zone plate free from any staircase pattern shift.

More specifically, since the previously formed pattern is observed, and the exposure process is performed along the previously formed pattern, even when pattern formation as a combination of the exposure and etching processes is performed a plurality of number of times, a position shift between two each adjacent patterns can be prevented, and a zone plate as designed can be obtained.

The method of the present invention will be described below while taking FIG. 3 as an example. FIG. 3 is a schematic view showing a case wherein a staircase section is formed by etching a substrate, and is an explanatory view showing a state after the second exposure. As can be seen from FIG. 3, since the surface of an object to be worked after the first exposure process has a three-dimensional pattern as a combination of projecting and recess patterns, regions to be cut include the edge portions of the projecting patterns and the edge portions of the recess patterns.

When the edge portion of a given projecting pattern is to be cut, the edge position, X, of the projecting pattern is detected, and a focused light spot as exposure light need only be irradiated along the edge position X of the projecting pattern. At this time, when the width, NR10, of the annular exposure region is equal to the exposure width (to be referred to an effective diameter hereinafter), $R_0$, obtained by the focused light spot, an annular exposure region having a desired width can be obtained by arranging the central position of the focused light spot at a position separated by $R_0/2$ from the edge position X of the projecting pattern.

On the other hand, when the width NR10 of the annular exposure region is larger than the effective diameter $R_0$, the exposure process need only be performed by irradiating the focused light spot to overlap each other a plurality of number of times until a desired width is obtained. For example, the first annular exposure region is formed by arranging the central position of the focused light spot at a position separated by $R_0/2$ from the edge position X of the projecting pattern.

Then, the second annular exposure region is formed by slightly shifting the central position of the focused light spot toward the center of the projecting pattern (in the direction of an arrow in FIG. 3). At this time, when the focused light spot position is determined so that the irradiation region of the focused light spot overlaps (or contacts) the previously exposed region, an annular exposure region having a larger width than the effective diameter, Φ, of the focused light spot can be obtained. Of course, an annular exposure region with a larger width may be obtained by expanding the diameter of the focused light spot to a desired width.

Similarly, when the edge portion of a given recess pattern is cut, the edge position, Y, of the recess pattern is detected, and the focused light spot is irradiated along the edge position Y of the recess pattern to perform exposure. At this time, an annular exposure region with a larger width can also be obtained by performing the exposure processes so that the focused light spot positions overlap each other or by expanding the diameter of the focused light spot to a desired width.

Since the cutting region of the next pattern to be formed is determined with reference to the previously formed pattern, an annular exposure region whose center precisely coincides with that of the previously obtained concentric circular pattern can be formed. For this reason, a pattern having a-staircase section can be formed with high precision without causing any pattern shift.

Furthermore, the present invention proposes a zone plate manufacturing apparatus which performs exposure by the above-mentioned method. More specifically, when a new three-dimensional section is formed on the surface of an object to be worked, which has already subjected to exposure and etching processes at least once and has at least one three-dimensional section (to be referred to as a previous three-dimensional section) by the processes, pattern position detection means detects the position of the pattern of the previous three-dimensional section, and outputs the detected information to control means.

This control means calculates the focused light spot position of exposure means to be a designed position on the basis of the position information input from the pattern position detection means, and outputs the calculation result to moving means as setting position information of the exposure means.

The moving means controls to move the exposure means on the basis of the input setting position information, so that the focused light spot position precisely matches the designed position on the object to be worked.

More specifically, the three-dimensional section information detected by the pattern position detection means is converted into position information of the next exposure region to be exposed, and the converted information is output to the moving means. As a result, the next exposure region to be exposed can be prevented from being shifted from the already formed pattern, and a newly formed pattern can be a concentric circular circle which precisely adjoins the previously formed pattern.

Therefore, a zone plate to be finally obtained has high diffraction efficiency, can reduce scattered light and stray light, and hardly generates wavefront aberration since it has the same pattern as the designed pattern.

The above-mentioned zone plate manufacturing apparatus preferably comprises memory means for storing a working region determined by the diameter and the width, in the radial direction, of a concentric circular pattern to be formed on an object to be worked.

Since the apparatus comprises the memory means for storing the diameter of a pattern and the working region, the control means can automatically determine the position and moving amount of the moving means on the basis of the position information input from the position detection means and working region information read out from the memory means, and a plurality of annular exposure regions can be automatically formed by continuously performing the exposure process.

The pattern position detection means may comprise means for irradiating light onto the previous three-dimensional section and detecting reflected light. At this time, exposure light and light other than the exposure light may be used as the light to be irradiated onto the surface of the object to be worked.

When the exposure light is used, since no extra optical-system is required, the apparatus arrangement can be simplified. However, upon manufacture of an optical element such as a BOE obtained by repeating the exposure and etching processes, a resist formed on the surface of an object to be worked may be undesirably exposed upon position detection for the next exposure process.

Therefore, the present invention proposes the non-contact type pattern position detection means using a light beam, which does not influence a photosensitive member formed on an object to be worked in practice, as inspection light. With this means, the resist layer formed on the surface to be worked is not exposed upon detection of the previous three-dimensional section, and the surface shape is not influenced by the inspection light. For this reason, the position detection and the exposure process can be continuously performed.

Furthermore, the present invention proposes the pattern position detection means which irradiates inspection light onto an object to be worked, and detects the position of a pattern by detecting scattered light at the edge portion of a pattern formed on the object to be worked. More specifically, since a detection system for detecting scattered light has a simple arrangement, it can be easily designed, and the design margin of the apparatus as a whole can be widened, resulting in convenience.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS (First Embodiment)

An apparatus according to the present invention will be briefly described below.

Figure 1:
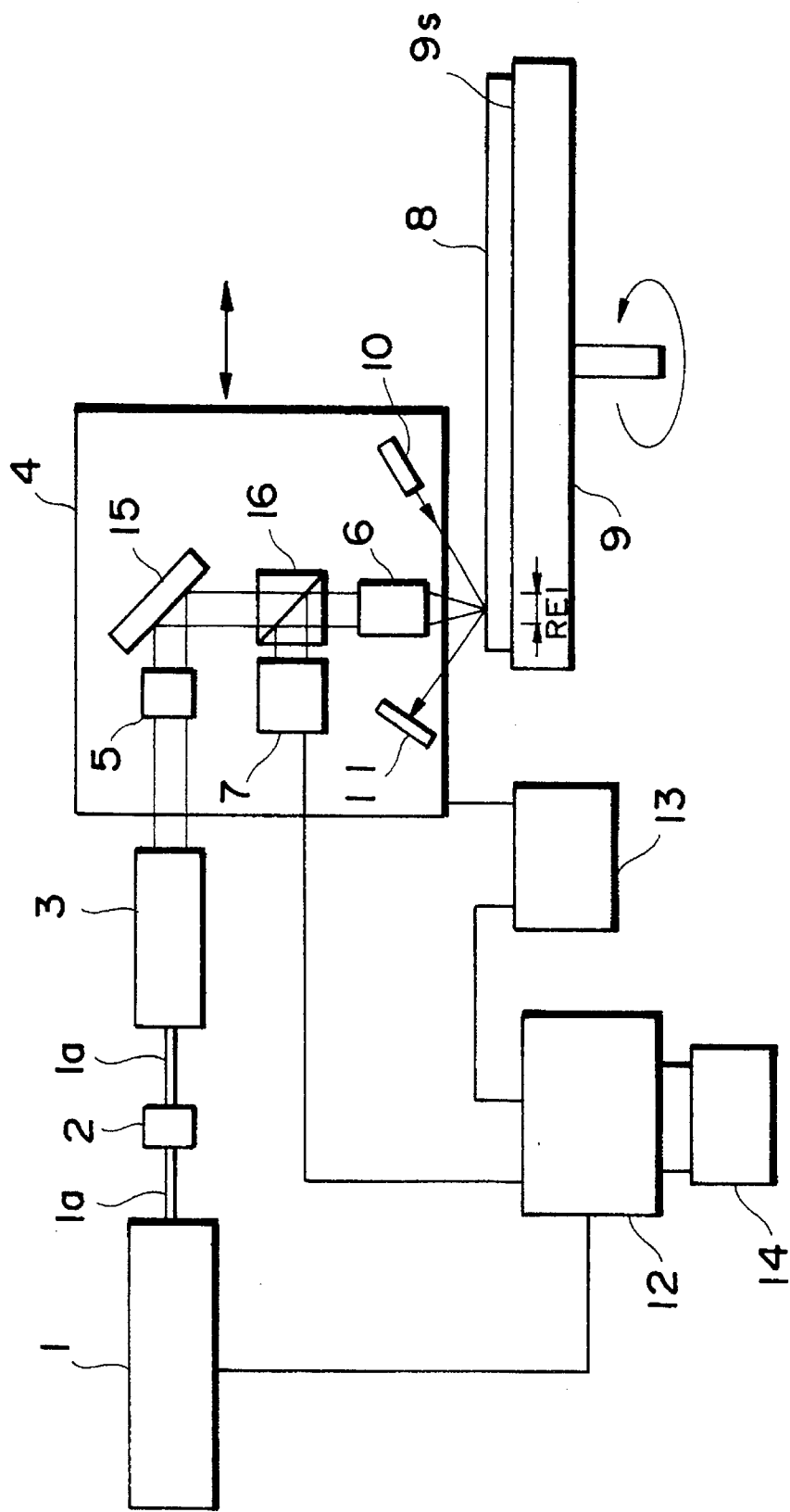
FIG. 1 is a schematic view showing an apparatus according to the first embodiment of the present invention.
Figure 15:
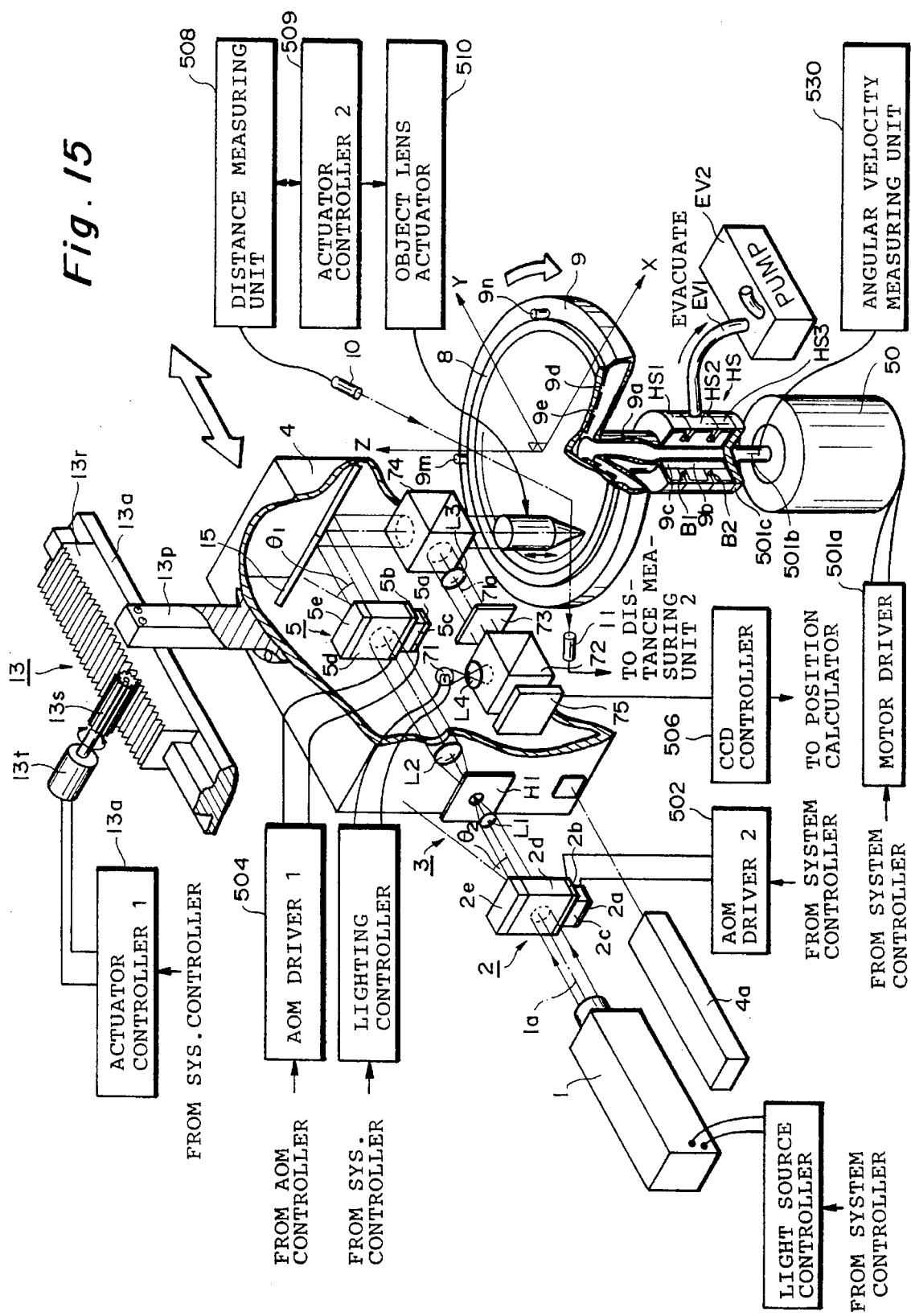
FIG. 15 is a perspective view for explaining the apparatus shown in FIG. 1 in more detail.
Figure 16:
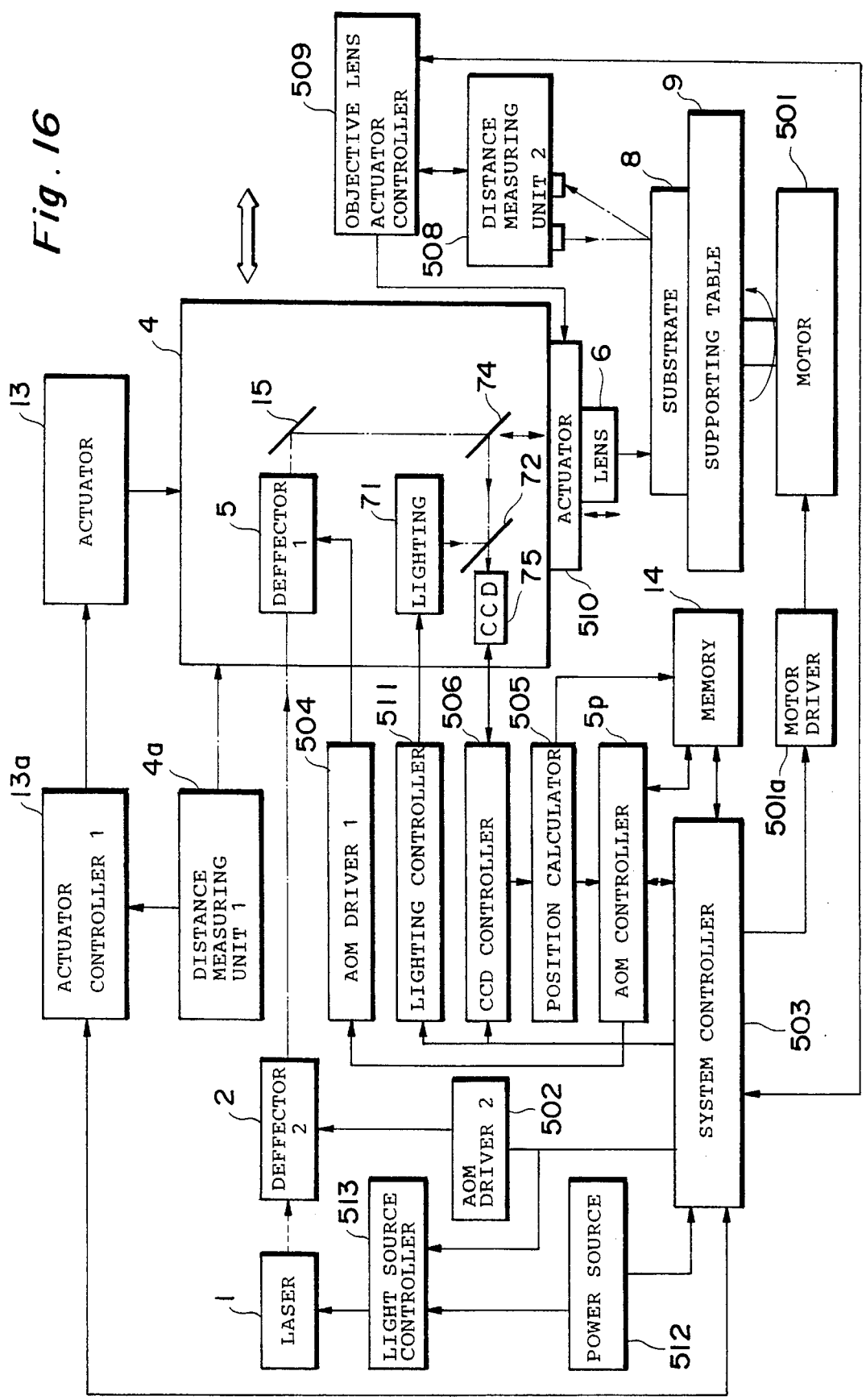
FIG. 16 is a block diagram for explaining the control of the apparatus shown in FIG. 15.

FIGS. 1, 15, and 16 show a zone plate manufacturing apparatus according to the first embodiment. This apparatus uses an Ar laser light source 1 for emitting a laser beam having a wavelength of 365 nm as an exposure light beam. A substrate 8 as an object to be worked is prepared by coating a resist film 8b (see FIG. 17C) on a glass substrate 8a, and is placed on a rotary stage (rotary table) 9. The substrate 8 is rotated upon rotation of the rotary stage 9. Since a light beam emitted by the laser light source 1 is focused on the substrate 8, the substrate 8 is exposed in an annular pattern.

Referring to FIG. 1, a light beam 1a emitted by the laser light source 1 is subjected to adjustment to a desired intensity by a modulator 2 when it passes the modulator 2, and the light beam emerges from the modulator 2. The light beam emerging from the modulator 2 is incident on a beam expander 3, and its diameter is expanded by the expander 3. The light beam then illuminates a deflector 5. The deflector 5 deflects the propagating direction of incident light, and changes the position of a focused light spot (to be described later), so that the focused light spot is focused at a normal position.

The light beam from the deflector 5 is incident on an objective lens 6, and is condensed to 1/100 by the objective lens 6. The condensed light beam is irradiated onto the substrate 8 as the object to be worked as a focused light spot.

Since the substrate 8 is rotated upon rotation of the rotary stage 9, the focused light spot irradiated onto the substrate 8 irradiates the substrate 8 in an annular pattern. At this time, a focal point (substrate vertical position) detector constituted by an LED 10 and a position sensor 11 detects the position of the substrate 8, and automatically moves the objective lens 6 vertically, so that the focal point is always adjusted in correspondence with the vertical displacement of the substrate 8.

Figure 2:
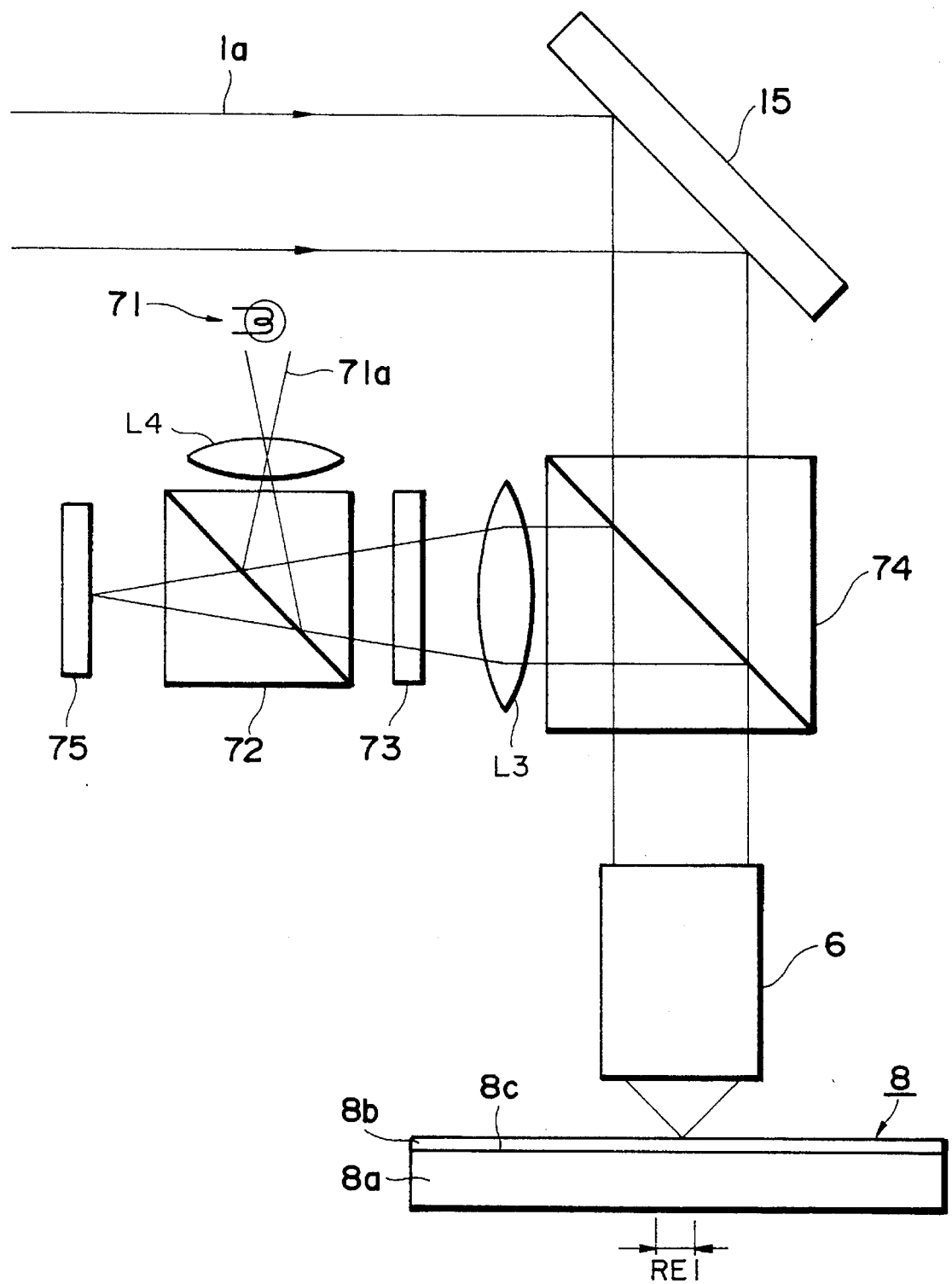
FIG. 2 is a schematic view showing principal part of the apparatus of the first embodiment.

A detection optical system 7 for detecting the position of a pattern is arranged between the deflector 5 and the objective lens 6. FIG. 2 is a schematic view of the position detection optical system 7. The position detection optical system 7 is constituted by a lighting system for irradiating lighting light emitted by a tungsten lamp 71 onto the substrate 8 via beam splitters 72 and 74, and a detection system for detecting light scattered by the edge portion of a pattern on the substrate 8 via the beam splitters 72 and 74, and further comprises a glass filter 73 in its optical path.

The glass filter 73 absorbs light components of short wavelengths from the lighting light to prevent the resist from being exposed and to prevent the laser beam from becoming incident on a position detector (image pickup device) 75. Light scattered by the edge portion of a pattern on the substrate 8 is imaged on the position detector 75 such as a CCD, and the position of the focused light spot on the substrate 8 can be detected by detecting a signal output from the detector 75.

Position information obtained by the position detection optical system 7 is output to a controller 12. This information is processed by the controller 12 together with the moving distance (the radial position of the detected edge position) in the radial direction, thus obtaining the information of a position where the focused light spot is to be formed. The controller 12 accesses a memory 14 as memory means to read out the diameter and the line width of a design pattern corresponding to the current position (radius), and to select the working region information of a pattern to be formed at the detected position of the pattern radius. The controller 12 outputs moving information to a head actuator 13 as moving means on the basis of the selected information.

Furthermore, the controller 12 outputs an output OFF command to the laser light source 1 after one exposure region is formed, and outputs an output ON command to the laser light source 1 again upon completion of movement of a movable head 4 by the head actuator 13 (to be described later). At the same time, the controller 12 supplies a command signal to the modulator 2 to change the intensity in correspondence with the radial position.

The above-mentioned deflector 5, objective lens 6, position detection optical system 7, and focal point (substrate vertical position) detector constituted by the LED 10 and the position sensor 11 are assembled in the head 4. The head actuator 13 receives the moving information from the controller 12, and moves the head 4 in the radial direction on the basis of the moving information.

The moving distance of the head 4 is precisely read by a laser interference distance measuring unit (not shown), and the read value is fed back to the head actuator 13 to precisely control the position of the head 4. In this case, when the control cannot follow the feedback value, the deflector 5 changes and corrects the spot position to a normal position.

A method of manufacturing a zone plate according to the present invention will be described below. After a photoresist is coated on the surface of the substrate 8, the substrate 8 is placed on the rotary stage 9. The rotary stage 9 is rotated while a focused laser beam is irradiated onto a desired position on the substrate 8 as a small spot. Since the substrate 8 is rotated upon rotation of the rotary stage 9, the focused light spot on the substrate 8 irradiates the substrate 8 to draw a circle having the center of rotation as the center.

The center of rotation of the rotary stage prior to an exposure process is aligned in advance to the central coordinate position of the head actuator 13, and the pattern shape (the position and width in the radial direction) of a required zone plate is pre-stored in the memory 14. The head actuator 13 moves the focused light spot to the edge position of one pattern, and a laser beam is irradiated while rotating the rotary stage 9. Thus, the resist on the substrate 8 is exposed in an annular pattern.

After one annular exposure region is formed, the controller 12 turns off the laser light source 1, reads out the position information of the next pattern from the memory 14, and outputs the readout information to the head actuator 13. The head actuator 13 moves the focusing position of the focused light spot by a predetermined amount in the radial direction of the exposure region, and thereafter, the controller 12 turns on the laser light source 1 to start exposure again. Then, a new annular exposure region which has the same center as but a different diameter from the above-mentioned annular exposure region is formed.

After a plurality of concentric circular exposure regions are formed by repeating the above-mentioned operations, the substrate is subjected to a predetermined development process, and is also subjected to a process such as etching, as needed. As a result, a pattern defined by a transmission region with steps depending on the presence/absence of the etching process is formed.

A photoresist is coated on the surface of the substrate 8 with the step pattern again, and the second exposure process is performed. At this time, it is very difficult to place the substrate on the rotary stage, so that the center of the already formed step pattern is precisely aligned to the center of the rotary stage, thus causing a slight position shift. If the rotary stage is rotated in this state, the step pattern is rotated in a decentered state.

Note that precise superpose exposure of concentric circular patterns may be attained in principle by detecting decentering information (the decentering distance, or the like based on the rotation angle) from the step pattern, and moving (decentering) the position of the focused light spot upon rotation of the substrate 8 in correspondence with the detected decentering information.

However, the substrate may expand or shrink due to a change in temperature or process, or the position of the focused light spot may shift due to the delay time of processing such as rotation angle detection, small movement of the focused light spot, and the like, thus disturbing precise superpose exposure. This is a fatal problem for an optical member requiring precise working, and the manufacturing cost of diffraction optical elements undesirably increases due to a low manufacturing yield.

For this reason, in this embodiment, the edge position is directly detected in an exposure operation, and exposure is performed based on the detected edge position. More specifically, in the apparatus according to this embodiment, the position detection optical system 7 detects the edge portion of the already formed step pattern, and outputs the detected information to the controller 12.

The controller 12 converts the information of the irradiation position of the focused light spot into moving information of the head position on the basis of the input detected information and design information obtained by accessing the memory 14, and outputs the converted information to the head actuator 13. The head actuator 13 moves the position of the focused light spot to a position along the edge portion based on the command information, and controls the focused light spot position to maintain a predetermined distance from this edge position (in the radial direction), as needed.

When the exposure operation is repeated by the above-mentioned method, annular exposure regions which precisely overlap the previously obtained concentric circular patterns can be formed, and they are precisely concentric to the already formed step pattern. For this reason, a new step pattern obtained after the subsequent processes such as development, etching, and the like precisely adjoins the previously formed step pattern without causing any decentering, and a design pattern is precisely transferred.

In this manner, according to this embodiment, the edge position is detected upon execution of an exposure process, and the detected position information is fed back to the head actuator in real time, thus preventing a shift from the previously formed three-dimensional pattern.

As described above, according to the method of manufacturing a zone plate according to the present invention, a pattern with a staircase section obtained by combining a plurality of concentric circular patterns can be precisely formed.

Furthermore, according to the zone plate manufacturing apparatus of the present invention, designed concentric circular patterns can be precisely exposed. Therefore, a zone plate such as a Fresnel zone plate, BOE, or the like to be finally obtained has high precision and uniform diffraction efficiency, and can reduce wavefront aberration.

Since a zone plate can be manufactured with high yield by the zone plate manufacturing apparatus of the present invention, the manufacturing cost of the zone plate can be consequently reduced.

The above-mentioned apparatus will be described in more detail below.

FIGS. 1, 15, and 16 show the apparatus according to the first embodiment. This apparatus draws a concentric circular pattern on the resist 8b (see FIG. 17B) coated on the transparent substrate 8a placed on the rotary stage (supporting table) 9 by irradiating the exposure beam 1a emitted by the light source 1 onto the resist 8b.

The rotary stage 9 is rotated by a motor 501. The motor 501 is electrically connected to a motor driver 501a, and its rotation is controlled by the driver 501a. The motor driver 501a is controlled by a system controller 503, and the rotational speed of the motor 501 is 30 to 30,000 revolutions/sec.

A shaft 501b of the motor 501 is connected to the rotary stage 9 via a hollow shaft 9a. The rotary stage 9 has an inner space, which communicates with the hollow shaft 9a. The rotary stage 9 and the hollow shaft 9a are fixed to each other. A plurality of through holes 9b and 9c are formed on the outer wall of the hollow shaft 9a. The region, where the through holes 9b and 9c are formed, of the hollow shaft 9a is stored in and sealed by a housing HS constituted by three members. Therefore, when a gas in the housing HS is drawn by suction by a vacuum pump EV2, a gas in the hollow shaft 9a is also drawn by suction by this pump EV2. Since the hollow shaft 9a communicates with the inner space of the rotary stage 9, the pressure of the inner space of the rotary stage 9 is reduced. An upper surface 9s of the rotary stage 9 has a plurality of through holes 9d and 9e communicating with the inner space. Therefore, when the substrate 8 is placed on the upper surface 9s and the gas in the inner space of the rotary stage 9 is drawn by suction by the pump EV2, the substrate 8 is chucked and fixed on the upper surface 9s of the rotary stage.

The housing HS has an upper housing HS1. The hollow shaft 9a is inserted in a through hole of the upper housing HS1, and the inner surface of the through hole is fixed to the outer wall of the hollow shaft 9a. The housing HS also has a middle housing HS2 which contacts the lower surface of the upper housing HS1 via a bearing B1 and to which a tube EV1 is fixed. The housing HS has a lower housing HS3 which has a bottom plate for sealing the lower end of the hollow shaft 9a. The lower housing HS3 is fixed to the shaft 501b of the motor 501 via a fixing plate 501c. Therefore, even when the rotary stage 9 is rotated by rotating the shaft 501b of the motor 501, the tube EV1 does not rotate relative to the motor 501.

Two pins 9m and 9n are fixed on the upper surface of the rotary stage. The two pins 9m and 9n are spatially separated from each other. When the circular substrate 8 is inserted between the pins 9m and 9n and the outer circumferential surface of the substrate 8 is pressed against these pins 9m and 9n, the substrate 8 is aligned to the rotary stage 9.

An optical system for irradiating an exposure beam onto the substrate 8 will be explained below. This apparatus comprises the objective lens 6, the detection optical system 7, modulation means (5 or 13), and the controller 12. As shown in FIGS. 2 and 15, the detection optical system 7 for detecting the position of a pattern is arranged between the deflector 5 and the objective lens 6, and comprises the lighting light source 71 and the image pickup device 75.

The light source 1 is an AR laser light source for emitting a laser beam having a wavelength of 365 nm as an exposure beam. The substrate 8 as an object to be worked on which the resist film 8b is coated is placed on the rotary stage 9, and is rotated upon rotation of the rotary stage 9. Since the light beam from the laser light source 1 is focused on the substrate 8 which is being rotated, the exposure beam 1a exposes the substrate 8 in an annular pattern.

The exposure beam 1a emitted by the light source 1 is incident on the modulator 2. The modulator 2 comprises an acoustooptic modulator (AOM), and the AOM 2 is arranged on the optical path of the exposure beam 1a which propagates from the light source 1 to the beam expander 3. The AOM 2 serves as a deflector which can deflect the output direction of light passing the AOM 2 by changing the frequency of an AC voltage applied across its electrodes 2a and 2b. The deflector 2 comprises the electrodes 2a and 2b, a piezoelectric crystal (PZT) 2c sandwiched between the electrodes 2a and 2b, an AO medium (PbMoO$_4$) 2d fixed to one electrode 2b, and an absorber 2e attached to the AO medium 2d at a position opposite to the electrode 2b. The electrodes 2a and 2b, and the piezoelectric crystal (PZT) 2c constitute a piezoelectric vibrator. (transducer.)

The voltage applied across the electrodes 2a and 2b of the modulator (second modulator) 2 is supplied from a second AOM driver 502. The second AOM driver 502 is controlled by the system controller 503. Upon irradiation of the exposure beam 1a onto the substrate 8, the system controller 503 outputs a control signal to the AOM driver 502, and the AOM driver 502 applies an AC voltage across the electrodes 2a and 2b in accordance with the instruction from the system controller 503, so as to maintain the optical path of the exposure beam 1a passing the AOM 2 constant before and after the passing.

When the exposure beam 1a is not irradiated onto the substrate 8, the system controller 503 outputs another control signal to the AOM driver 502, and the AOM driver 502 applies an AC voltage across the electrodes 2a and 2b in accordance with the instruction from the system controller 503, so as to prevent the exposure beam passing the AOM 2 from passing the beam expander 3. At this time, the exposure beam 1a is deflected upward through an angle $\theta_2$.

The exposure beam 1a passing the AOM 2 is guided to the beam expander 3. The beam expander is arranged on the optical path of the exposure beam 1a which propagates from the light source 1 to the deflector 5 to widen the diameter of the exposure beam 1a incident thereon. The beam expander 3 comprises opposing lenses L1 and L2, and an aperture stop H1 arranged between the lenses L1 and L2.

The exposure beam 1a passing the beam expander 3 is incident into the deflector 5. The deflector 5 comprises an acoustooptic modulator (AOM) arranged on the optical path of the exposure beam 1a which propagates from the light source 1 to the objective lens 6. The deflector 5 can deflect the output direction of light passing therethrough by changing the frequency of an AC voltage applied across its electrodes 5a and 5b. The deflector 5 comprises the electrodes 5a and 5b, a piezoelectric crystal 5c sandwiched between the electrodes 5a and 5b, an AO medium 5d fixed to one electrode 5b, and an absorber 5e attached to the AO medium 5d at a position opposite to the electrode 5b. The electrodes 5a and 5b, and the piezoelectric crystal 5c constitute a piezoelectric vibrator (transducer). When the deflector 5 deflects the exposure light beam 1a through an angle, $\theta_1$, in a direction to separate from the rotary stage 9 in a plane perpendicular to the surface of the rotary stage 9, the position of the focused light spot moves by about $L\theta_1$ in a direction to separate from the center of rotation of the rotary stage (L is the optical path length between the substrate 8 and the deflector 5).

The voltage applied across the electrodes 5a and 5b of the deflector (first modulator) 5 is supplied from a first AOM driver 504. The first AOM driver 504 is controlled by an AOM controller 5p. In order to scan the exposure beam 1a to move the beam irradiation position on the substrate 8, the AOM controller 5p outputs a control signal to the driver 504 on the basis of the position of an edge ED1 of the step portion of the substrate, which position is calculated by a position calculator 505.

The AOM driver 504 applies an AC voltage across the electrodes 5a and 5b in accordance with the instruction from the controller 5p, so as to irradiate the exposure beam 1a passing the deflector 5 onto a region adjacent to the edge position of the step portion of the substrate.

The angle defined between a mirror 15 and the surface 9s of the rotary stage is 45°. The exposure beam 1a passing the deflector 5 is reflected by the mirror 15, and is guided to a beam splitter 16.

The exposure beam 1a incident into the beam splitter 16 is transmitted through the beam splitter 16 and is incident onto the objective lens 6.

The exposure beam 1a is transmitted through the objective lens 6 and is guided toward a first region RE1 on the rotary stage 9. Since the transparent substrate 8a coated with the resist 8b is placed on the region RE1, the exposure beam 1a is focused on the resist 8b (substrate 8), and the portion, irradiated with the exposure beam 1a, of the resist 8b is exposed. The reduction ratio of the objective lens 6 is 1/100, and hence, the diameter of the exposure beam 1a passing the objective lens 6 is reduced to 1/100. The light spot is focused on the substrate 8.

Another light is irradiated from the detection optical system 7 onto the resist 8b via the objective lens 6. This light is lighting light 71a emitted by the lighting light source 71. More specifically, the lighting light source 71 irradiates the lighting light 71a toward the first region RE1 on the rotary stage 9 via the objective lens 6. Therefore, the portion, irradiated with the exposure light 1a, of the resist 8b is also irradiated with the lighting light 71a (see FIGS. 2 and 15). The lighting light source 71 comprises a tungsten lamp for emitting light having a wavelength longer than that of light emitted by the Ar laser light source 1. The lighting light source 71 is ON/OFF-controlled by a lighting controller 511. The lighting controller 511 turns off the lighting light source 71 when the position calculator 505 does not detect the position of the edge ED1. Since the operation of the position calculator 505 is controlled by the system controller 503, the system controller 503 outputs a control signal to the lighting controller 511 to turn on/off the lighting light source 71.

The detection optical system 7 comprises the lighting system for irradiating the lighting light 71a from the tungsten lamp 71 onto the substrate 8 via the beam splitters 72 and 74, and the detection system for detecting light scattered by the edge portion of a pattern on the substrate 8 via the beam splitters 72 and 74. The glass filter 73 is arranged in the optical path of the lighting light which propagates from the tungsten lamp 71 to the objective lens 6.

The glass filter 73 absorbs light components of short wavelengths from the lighting light to prevent the resist 8b from being exposed and to prevent the laser beam 1a from becoming incident on the position detector 75. Light scattered by the edge portion of a pattern on the substrate 8 is imaged on the position detector 75 such as a CCD. The lighting light source 71 is arranged in this apparatus to light the transparent substrate 8a via a predetermined region NR2 of the resist 8b irradiated with the exposure beam 1a. Therefore, in order to prevent the resist 8b from being exposed by the lighting light 71a, the filter 73 for absorbing light components in a wavelength range, which exposes the resist 8b, is arranged in the optical path of the lighting light 71a which propagates from the lighting light source 71 to the objective lens 6.

The position detector (image pickup device) 75 converts an optical image formed on its light-receiving surface into an electrical signal, and outputs the electrical signal. Electrons generated by photoelectric conversion in the image pickup device 75 are sequentially transferred in the image pickup device 75 upon application of a voltage from a CCD controller 506 to a transfer electrode (not shown) of the image pickup device 75, and the transferred video signal is input to the position calculator 505 via the CCD controller 506. The position calculator 505 comprises a filter for removing noise from the input signal, an A/D converter for converting an analog signal into a digital signal, and a calculation unit for calculating the position of the edge ED1 with respect to a predetermined reference position from the digital signal output from the A/D converter. The digital signal output from the position calculator 505 is stored in the memory 14. The data stored in the memory 14 is read out by the AOM controller 5p. The AOM controller adds data corresponding to the diameter of the exposure beam 1a to the data of the edge position read out from the memory, and outputs a control signal to the AOM driver 504, so that the exposure beam 1a is irradiated at the position defined by the sum data. For example, if the position of the edge ED1 with reference to the center (0, 0) of the rotary stage at time t, which is calculated by the position calculator 505, is represented by (x, y), and the radius, at the irradiation point onto the substrate 8, of the beam 1a is represented by ($R_0/2$), the AOM controller 5p outputs a control signal to the AOM driver 504 to control the deflector 5 to deflect the beam 1a, so that the beam 1a is irradiated at a position $(x-R_0 y/2(x^2+y^2)^{1/2}, y-R_0 x/2(x^2+y^2)^{1/2})$. In the apparatus shown in FIG. 15, in order to shorten the calculation time of the position calculator 505, the position calculator 505 detects a one-dimensional position (0, y) of the edge ED1, and the AOM controller 5p outputs a control signal to the AOM driver 504 to control the deflector 5 to deflect the beam 1, so that the exposure beam 1a is irradiated at a position $(o, y-R_0/2)$. When the exposure beam 1a is deflected through the angle $\theta_1$, the focused light spot position moves by about $L\theta_1$ in the direction to separate from the center of rotation of the rotary stage. For this reason, if the position of the edge ED1 at time t is (0, y), the AOM controller 5p outputs a control signal to the AOM driver 50 to control the deflector 5 to deflect the beam 1a through $\theta_1=-R_0/2L$, so that the deflected beam 1a is irradiated onto the substrate 8 at time $t+2\pi/\omega$.

The focused light spot position of the exposure beam 1a can also be calculated by the position calculator 505 on the basis of the video signal from the image pickup device 75.

The detection optical system 7 comprises a convex lens L3 inserted between the filter 73 and the beam splitter 74, and a convex lens L4 inserted between the beam splitter 72 and the lighting light source 71.

Detection of the edge position will be described in more detail below.

The exposure beam 1a emitted by the light source 1 is reflected by the mirror 15 toward the objective lens 6. On the other hand, since the beam splitter 16 is inserted between the objective lens 6 and the mirror 15, the exposure beam 1a guided from the direction of the mirror 15 to the beam splitter 16 is transmitted through the beam splitter 16, and is incident onto the objective lens 6. The lighting light 71a emitted by the lighting light source 71 is deflected by the beam splitter 16, is incident onto the objective lens 6, and is then irradiated onto the resist 8b. The lighting light (the light reflected by the substrate 8) 71a which is guided to the beam splitter 16 via the objective lens 6 from the direction of the rotary stage 9, i.e., an image of the transparent substrate 8a, is deflected by the beam splitter 16, and is irradiated onto the image pickup device 75. The beam splitter 16 is arranged on the optical path of the exposure beam 1a which passes between the objective lens 6 and the mirror 15.

Figure 3:
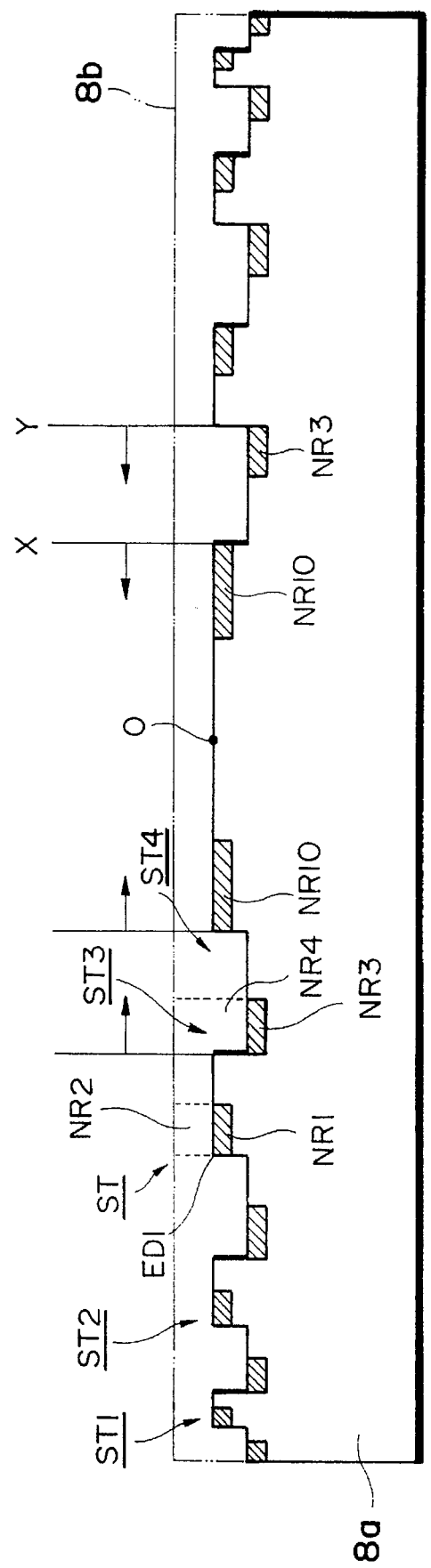
FIG. 3 is a side view showing a zone plate.
Figure 4A:
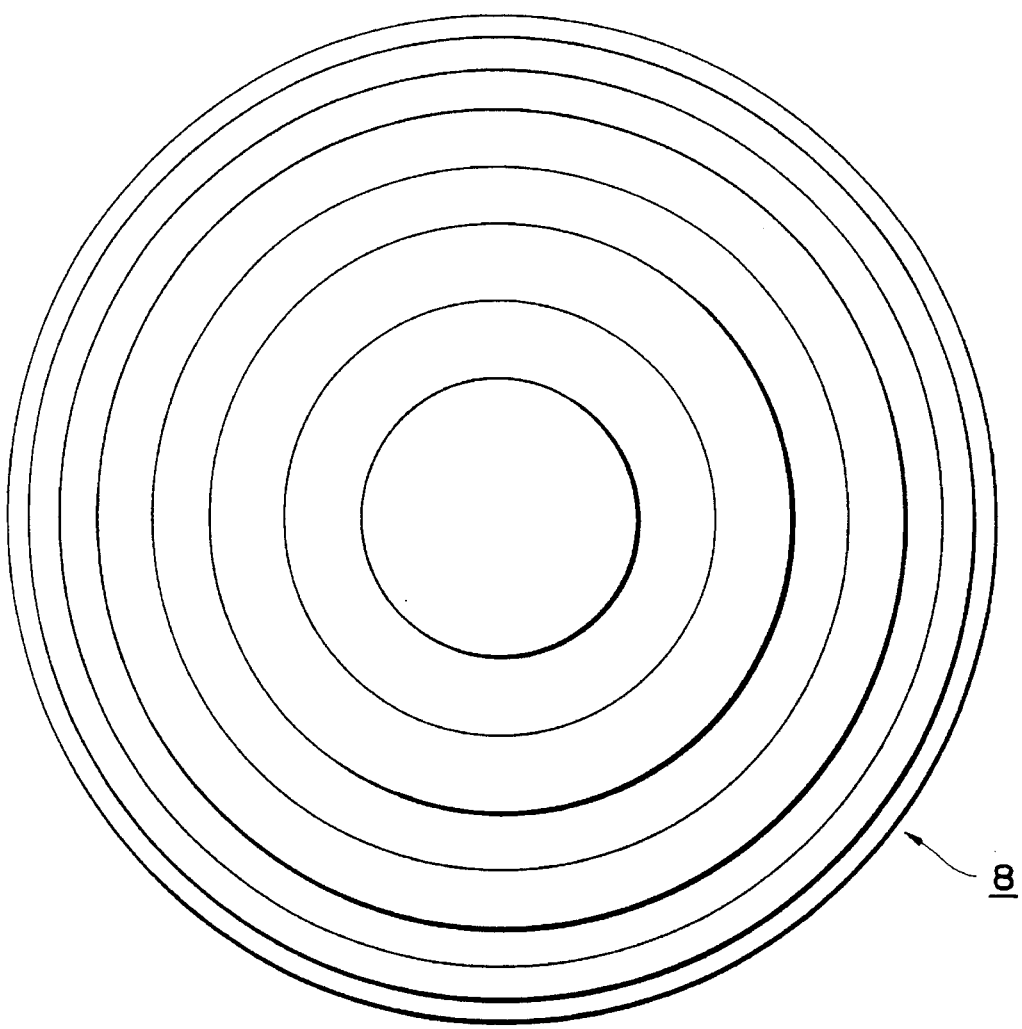
FIG. 4A is a plan view of a zone plate.
Figure 4B:
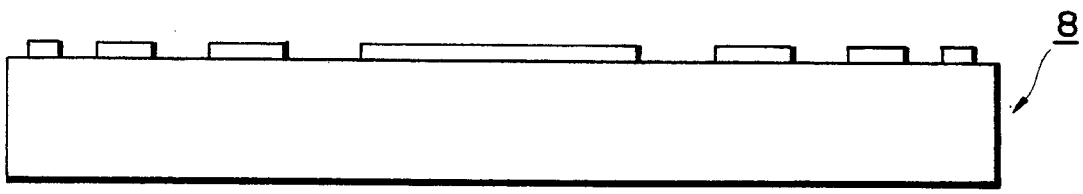
FIG. 4B is a side view showing the zone plate shown in FIG. 4A.
Figure 5A:
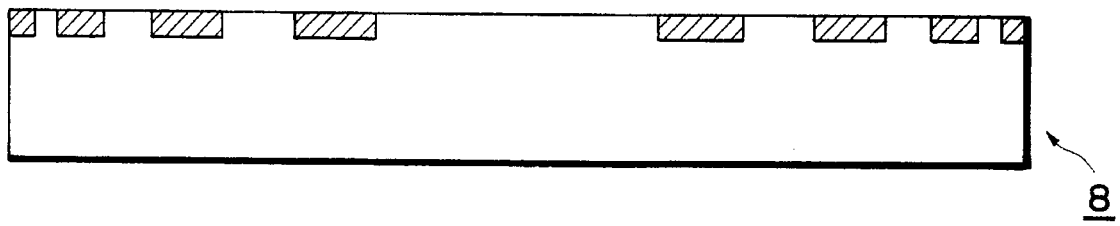
FIGS. 5A to 5D are views for explaining a method of manufacturing a zone plate.
Figure 5B:
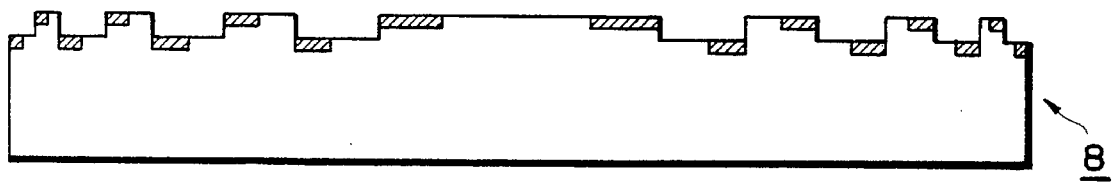
Figure 5C:
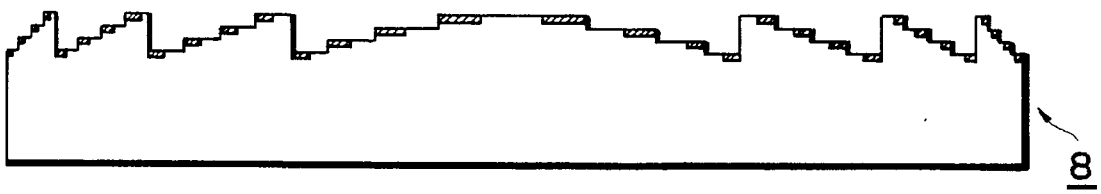
Figure 5D:
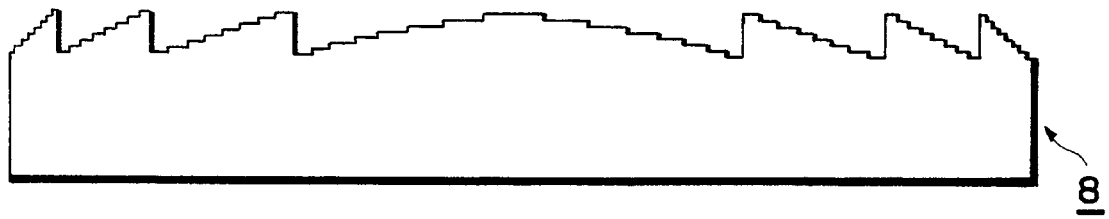
Figure 6A:
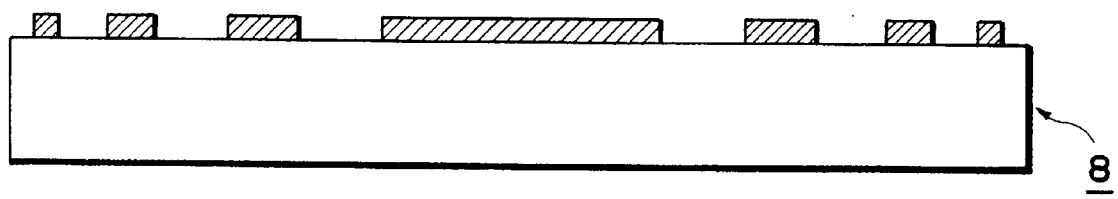
FIGS. 6A to 6C are views for explaining another method of manufacturing a zone plate.
Figure 6B:
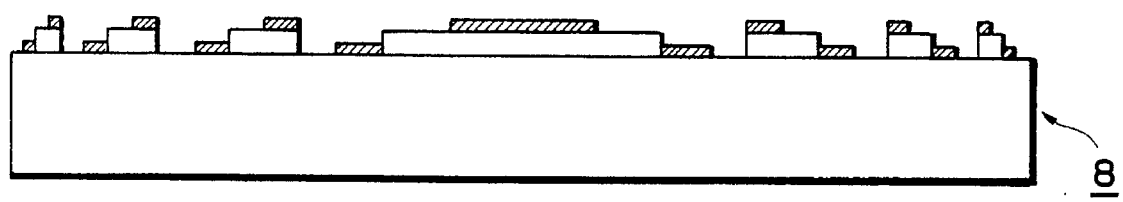
Figure 6C:
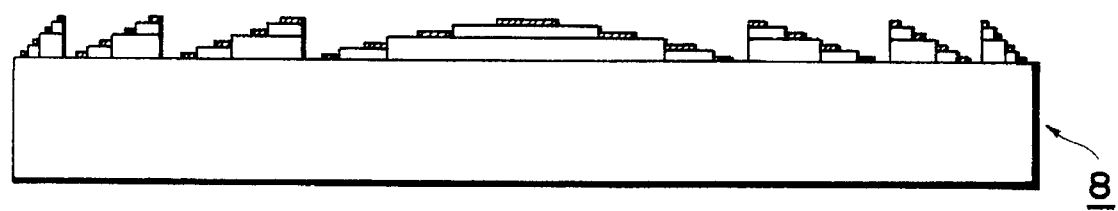
Figure 7:
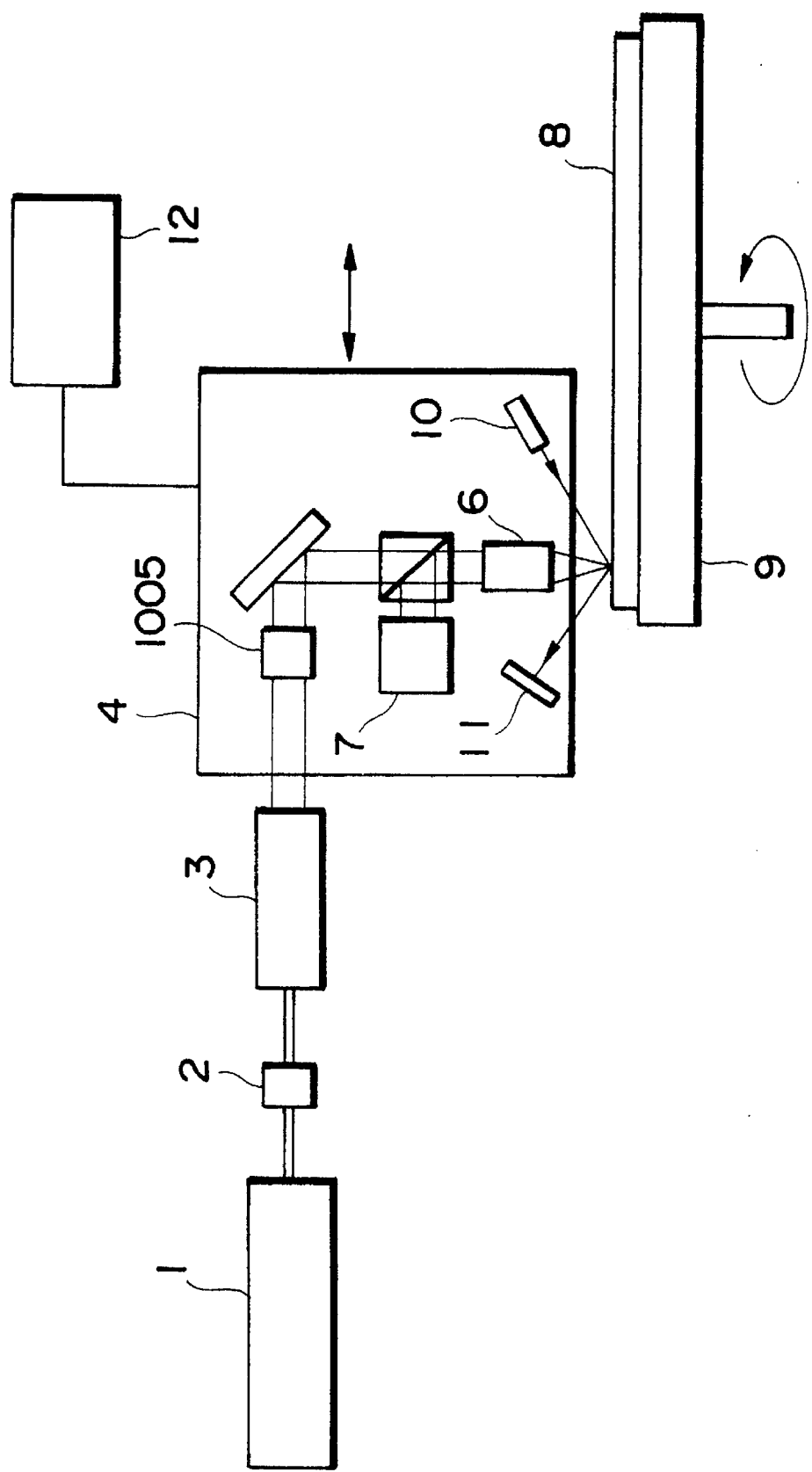
FIG. 7 is a schematic view showing an apparatus according to the second embodiment of the present invention.

The resist 8b is coated on the transparent substrate 8a on which a diffraction grating has already been formed. An image of the diffraction grating on the transparent substrate 8a is obtained by irradiating the lighting light 71a onto the transparent substrate 8a, and the image from the first region RE1 is picked up by the image pickup device 75 via the objective lens 6. The image pickup device 75 comprises a CCD image pickup element. As shown in FIG. 3, the diffraction grating is constituted by a plurality of step portions ST1 to ST4 on the transparent substrate 8a. The image to be picked up by the image pickup device 75 is an image of the edge ED1 of one of the step portions ST1 to ST4 formed on a surface 8c of the transparent substrate 8a, and the controller 12 controls the modulation means (5 or 13) to irradiate the exposure beam 1a onto a resist 8b portion coated on a predetermined region NR1, adjacent to the edge ED1, of the transparent substrate.

More specifically, the controller 12 comprises the position calculator 505 for calculating the position of the edge ED1 on the basis of the output from the image pickup device 75. Based on the calculated position of the edge ED1, the exposure beam 1a is irradiated onto the region NR1 on the resist 8b, neighboring the edge ED1 of the step portion ST3 of the transparent substrate 8a.

The modulation means (5, 13) changes the optical path of the exposure beam 1a, so that the exposure beam 1a is irradiated onto the region RE1 observed by the image pickup device 75. The controller 12 controls the modulation means (5, 13) on the basis of a signal input from the image pickup device 75.

The position calculator 505 calculates the position of the edge ED1 on the basis of the output from the image pickup device 75, and the AOM controller 5p controls the deflector 5, so that the exposure beam 1a is irradiated onto the resist 8b portion coated on the predetermined region NR1, adjacent to the edge ED1, of the transparent substrate 8a.

Figure 19:
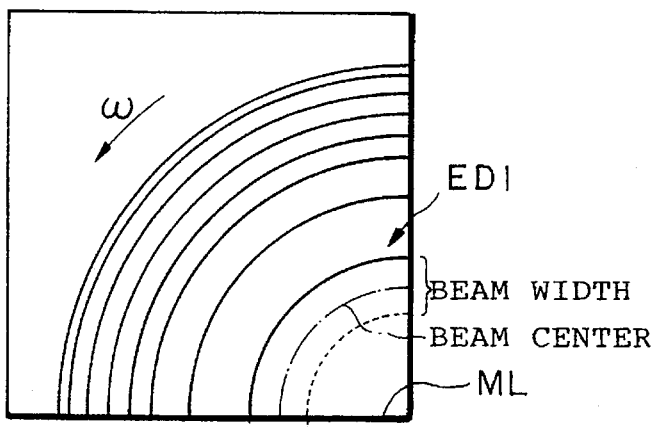
FIG. 19 is a view for explaining a method of controlling the apparatus of the first embodiment.
Figure 19:
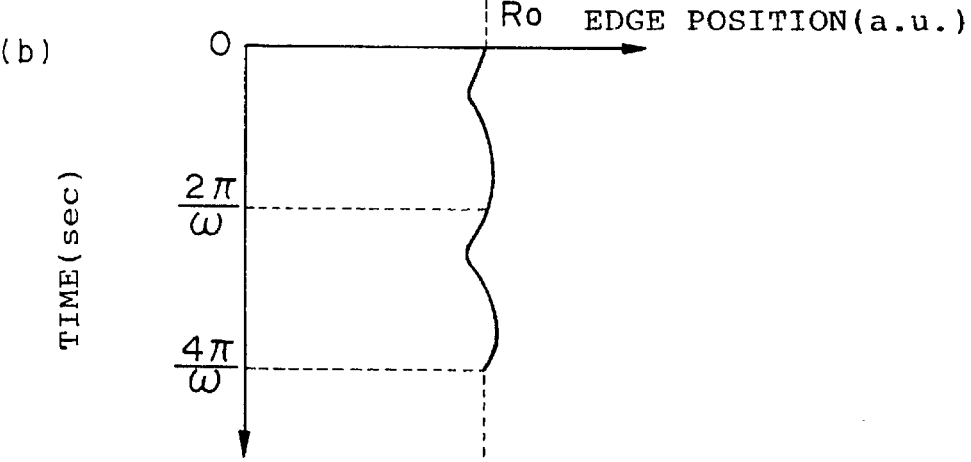
Figure 19:
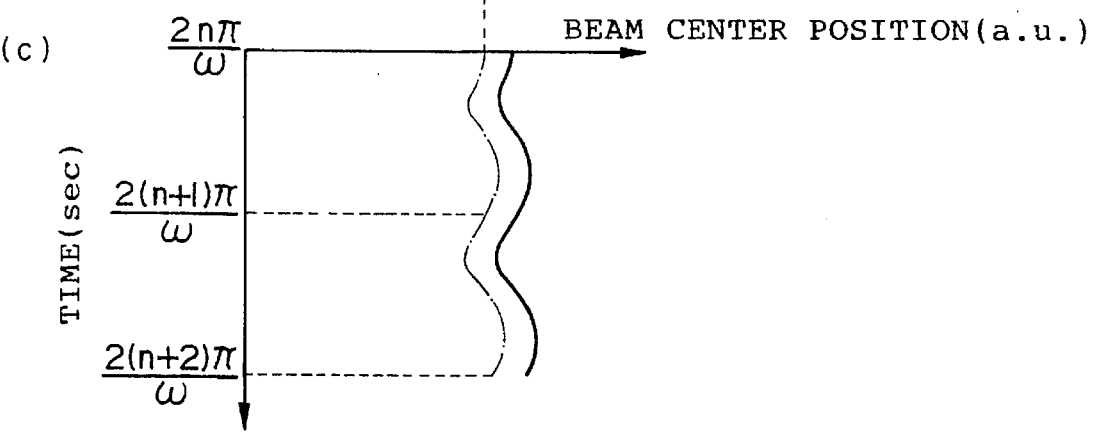

More specifically, this apparatus further comprises the memory 14 for storing the position of the edge ED1 calculated by the position calculator 505. As shown in FIGS. 19(a) to 19(c), the memory 14 accumulates the output from the position calculator 505 from time $2\pi/\omega$ (sec) to time $4\pi/\omega$ (sec). The AOM controller 5p controls the deflector 5, so that the exposure beam 1a is irradiated onto a position obtained by subtracting half the diameter $R_0$ of the exposure beam 1a from the data of the position of the edge ED1 accumulated on the memory 14. Note that $\omega$ is the rotational speed (rad/sec) of the rotary stage 9, $\pi$ is the ratio of circumference of circle to its diameter, and n is an integer.

Figure 20:
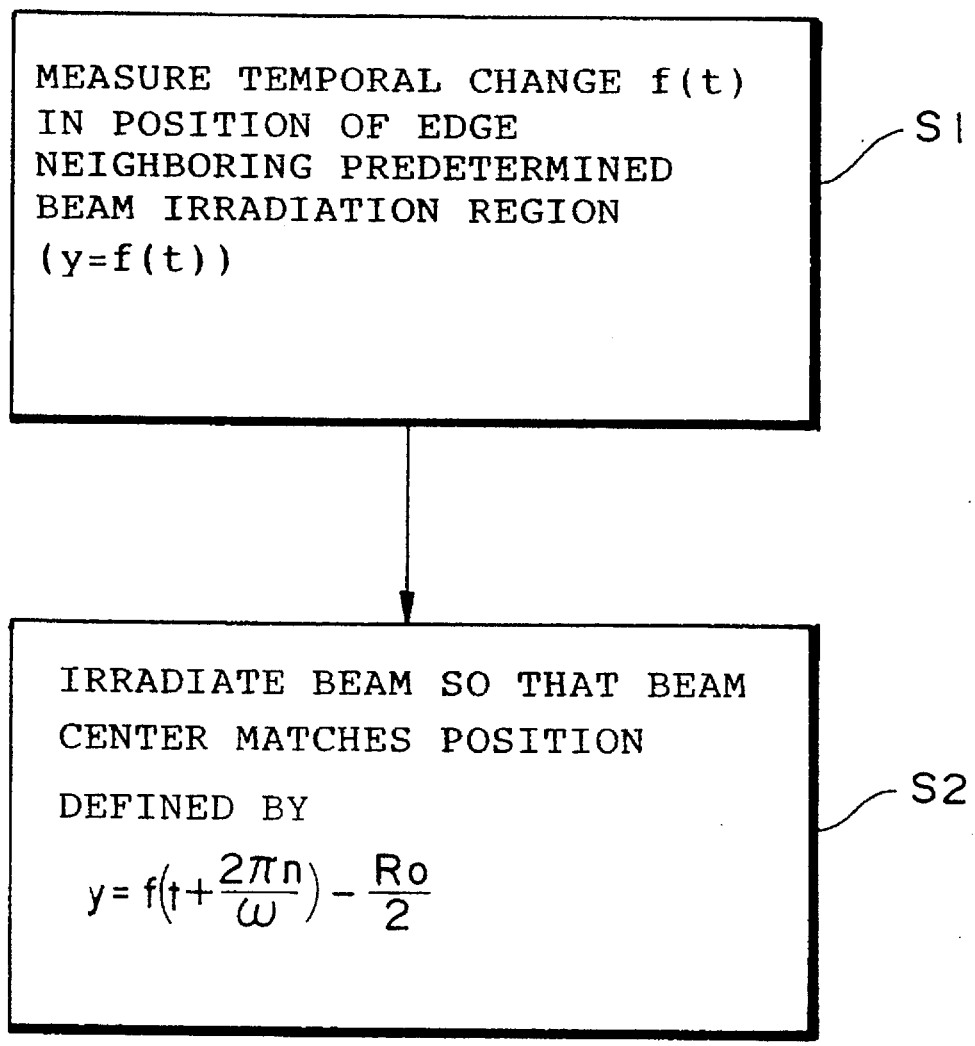
FIG. 20 is a flow chart for explaining the control of the apparatus of the first embodiment.

More specifically, as shown in FIG. 19(a), the position calculator 505 calculates the intersection position between a predetermined measurement line ML and the first edge ED on the basis of the video signal from the image pickup device 75, and data (0, y) of the calculated intersection position is stored in the memory 14. If the rotational speed of the motor is assumed to be N revolutions/sec, the substrate 8 completes one revolution in a period T=1/N sec= $2\pi/\omega$ sec. The time required for storing this position data is more than $2\pi/\omega$ sec, i.e., more than 1/N sec. An angular velocity measuring unit 530 attached to the shaft 501b of the motor 501 measures the rotation angle of the rotary stage 9 per very short unit time, and outputs information of the rotation position (rad) and the angular velocity, $\omega$ (rad/sec), of the rotary stage. The angular velocity measuring unit 530 for measuring the rotation position and the rotation angular velocity of the rotary stage 9 stores the information of the rotation angular velocity $\omega$ of the substrate 8 in the memory 14 together with the intersection position data between the edge and the measurement line. Therefore, the memory 14 stores data of the intersection position (0, y) from time $2\pi/\omega$ (sec) to time $4\pi/\omega$ (sec), as shown in FIG. 19(b). The system controller 503 controls the motor driver 501a to obtain a constant angular velocity $\omega$. When the time has reached $2(n+1)\pi/\omega$ (sec), the AOM controller 5p controls the deflector 5, so that the exposure beam 1a is irradiated at a position (0, y-½$R_0$) obtained by subtracting half the diameter $R_0$ of the exposure beam 1a from the data (0, y) of the position of the edge ED1 accumulated on the memory 14 at time $2\pi/\omega$ (sec). More specifically, if the intersection position data between the measurement line ML and the position of the edge ED1 at time $T_0=2\pi/\omega$ (sec) is represented by {0, $y_0(T_0)$}, the irradiation position of the exposure beam 1a at time $T=(n+1)T_0$ is {0, $y_0(T)-R_0/2$}. As shown in FIG. 19(c), the AOM controller 5p controls the deflector 5, so that the exposure beam is irradiated at the position {0, $y_0(T)-R_0/2$}. In other words, as shown in the flow chart in FIG. 20, the controller 12 measures a temporal change y=f(t) of the position y of the edge ED1 neighboring the prospective beam irradiation region (s1), and controls the modulation means (deflector) 5, so that the center of the exposure beam 1a is located at a position defined by $y=f(t+2\pi n/\omega)-R_0$ (s2). Note that t is time.

In place of this modulation means 5, an actuator 13 for moving the head 4 to which an optical system for guiding the exposure beam 1a onto the resist 8b is fixed may be used. The mirror 15, the beam splitter 16, and the objective lens 6 are fixed to the head 4. Therefore, when the actuator 13 moves the head 4 relative to the rotary stage 9, the optical path of the exposure beam 1a is changed, and the exposure beam 1a is irradiated at a different position on the resist 8b.

More specifically, as shown in FIGS. 19(a) to 19(c), the memory 14 accumulates the output from the position calculator 505 from time $2\pi/\omega$ (sec) to time $4\pi/\omega$ (sec). The system controller 503 reads out the position data of the edge ED1 accumulated on the memory 14 from time $2(n+1)\pi/\omega$ (sec) to $2(n+2)\pi/\omega$ (sec), and inputs the readout data to an actuator controller 13a. The actuator controller 13a controls the actuator 13 to move the head 4, so that the exposure beam 1a is irradiated at a position obtained by subtracting half the diameter $R_0$ of the exposure beam 1a from the position data (0, y) of the edge ED1 accumulated on the memory 14.

The position of the head 4 is detected by a laser distance measuring unit 4a. The actuator 13 for the head 4 is controlled by the actuator controller 13a on the basis of the output from the laser distance measuring unit 4a, when the actuator controller 13a moves the head 4 located at a position y to a position y–$R_0$/2, the actuator controller 13a outputs a control signal for moving the head 4. The laser distance measuring unit 4a always monitors the position of the head 4. When the position of the head 4 monitored by the laser distance measuring unit 4a is smaller than the desired position y–$R_0$/2, the actuator controller 13a drives the actuator 13 to increase the position of the head 4; when the position of the head 4 monitored by the laser distance measuring unit 4a is larger than the desired position y–$R_0$/2, the actuator controller 13a drives the actuator 13 to decrease the position of the head 4.

The actuator 13 comprises an arm 13p fixed to the head 4, a member 13q fixed to the arm 13p and having a corrugated surface, a rail 13r for slidably holding the member 13q, a gear 13s meshing with the surface of the member 13q, and a stepping motor 13t having a shaft fixed to the center of the gear.

After the exposure beam 1a is irradiated onto a region NR2 of the resist 8b on the predetermined region NR1, the actuator controller 13a drives the actuator 13, so that the exposure beam 1a is irradiated onto a region NR4 of the resist 8b on a region NR3 neighboring the step ST3 next to a step ST. While the beam is moved from the region NR2 to the region NR4, the system controller 503 controls the AOM driver 502 to deflect the exposure beam 1a passing the modulator 2, so that the exposure beam 1a is not irradiated onto the resist 8b.

This apparatus comprises a focal point position detector (distance measuring unit) 508, an actuator 510 for the objective lens 6, and a focal point position controller (actuator controller) 509. The focal point position detector 508 measures the distance between the objective lens 6 and the resist 8b. The actuator 510 for the objective lens 6 moves the objective lens 6 along a direction normal to the surface 9s of the rotary stage 9. The focal point position controller 509 controls the actuator 510 on the basis of the output from the focal point position detector 508.

Since the substrate 8 is rotated upon rotation of the rotary stage 9, the focused light spot irradiates the substrate 8 in an annular pattern. At this time, the focal point position (substrate vertical position) detector 508 constituted by the LED 10 and the position sensor 11 detects the position of the substrate 8, and the focal point position controller 509 drives the actuator 510 to automatically move the objective lens 6 vertically, so that the focal point of the exposure beam 1a is always formed on the surface of the resist 8b in correspondence with the vertical displacement of the substrate 8 even during rotation of the substrate 8.

More specifically, when the substrate 8 is not placed on the rotary stage 9, the focal point position controller 509 is controlled by the system controller 503 not to drive the actuator 510.

A power source 512 supplies electric power to the system controller 503 and a light source controller 513. The light source controller ON/OFF-controls the light source 1 in accordance with an instruction from the system controller 503.

The method of manufacturing a zone plate will be explained below with reference to FIGS. 17A to 17O.

First, a method of forming a concentric circular diffraction grating constituted by a plurality of step portions on the surface 8s of the transparent substrate 8a, as shown in FIGS. 17A to 17H, will be described.

Figure 17A:
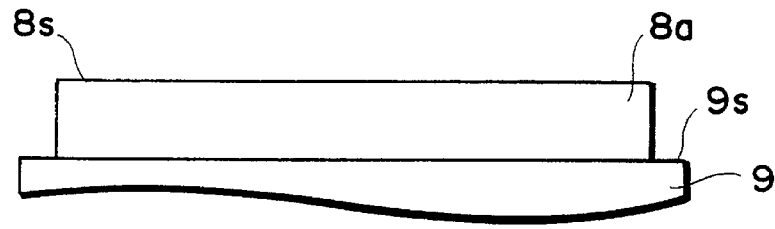
FIGS. 17A to 17O are views for explaining a method of manufacturing a zone plate.
Figure 17B:
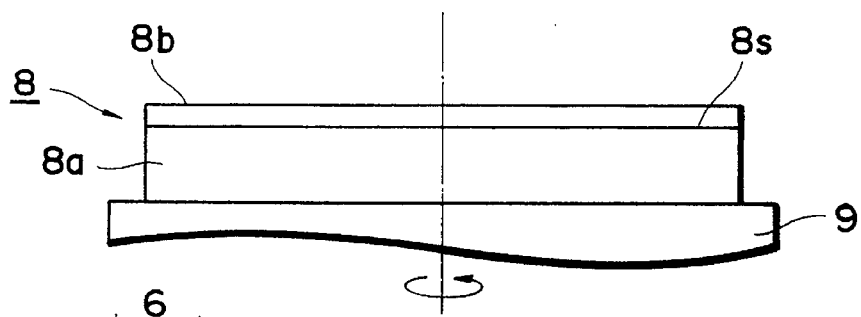
Figure 17C:
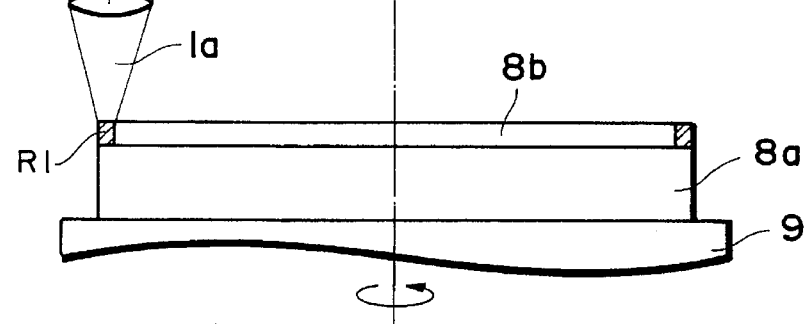
Figure 17D:
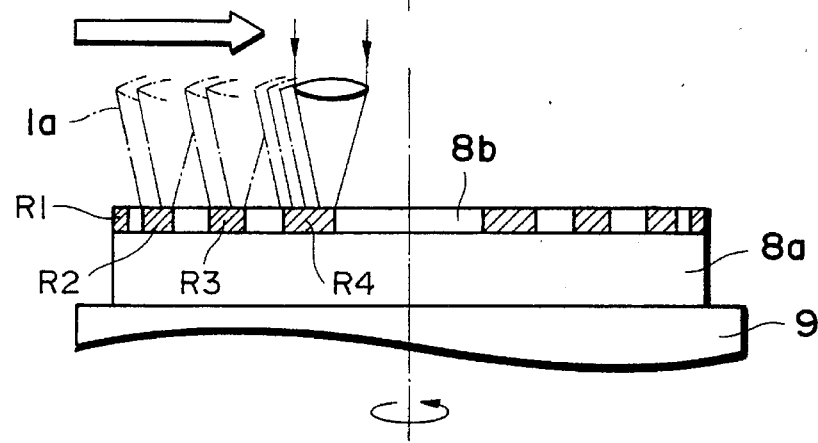

The transparent substrate 8a is fixed on the rotary stage 9 (see FIG. 17A). A positive resist 8b is coated on the surface 8s of the transparent substrate 8a while rotating the substrate 8a (see FIG. 17B). The exposure beam 1a is irradiated onto a predetermined region R1 on the resist 8b while rotating the substrate 8 (see FIG. 17C). The irradiation of the beam 1a onto the resist 8b is stopped, and the head 4 is moved. After the head 4 is moved by a predetermined distance, the beam 1a is irradiated onto a region R2, neighboring the predetermined region R1, on the resist 8b, while rotating the substrate 8 (see FIG. 17D). Since the width of the region R2 is larger than the diameter of the beam 1a, the head 4 is moved while irradiating the beam 1a onto the resist 8b, thereby exposing the resist 8b on the region R2. Similarly, the exposure beam 1a is irradiated onto the resist 8b on each of regions R3 and R4 to expose the resist 8b of each of these regions.

Figure 17E:
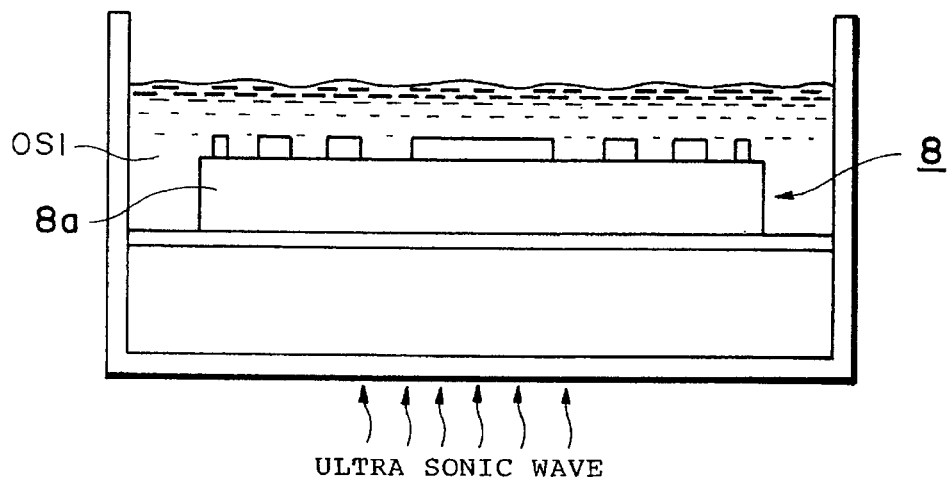

The substrate 8 having the resist 8b with the locally exposed regions R1 to R4 is dipped in an organic solvent OS1 such as Tricrene, acetone, or the like to remove the exposed regions of the resist 8b from the transparent substrate 8a (see FIG. 17E). Upon removal, an ultrasonic wave is applied to the substrate 8.

Figure 17F:
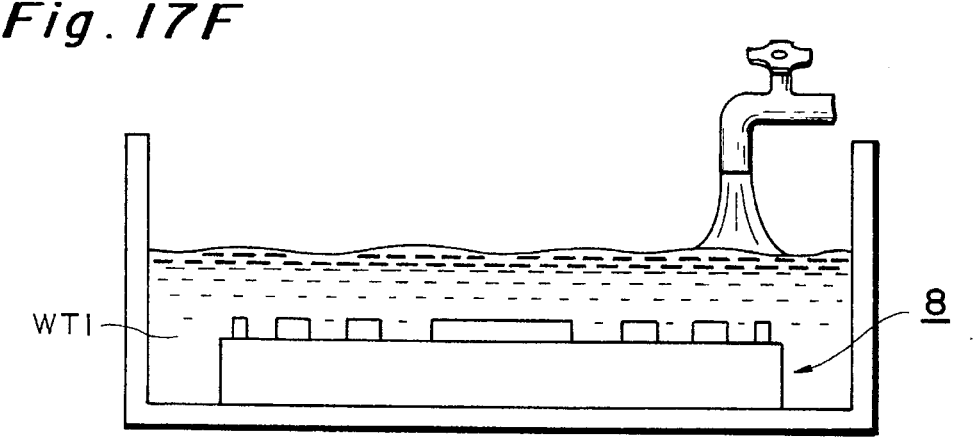

Then, the substrate 8 is washed with water WT1 (FIG. 17F).

Figure 17G:
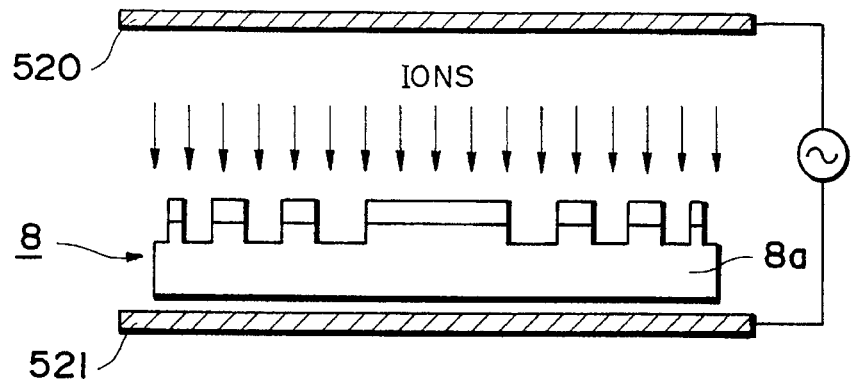

The exposed regions of the transparent substrate 8a coated with the resist 8b are etched by irradiating Ar ions onto these regions (see FIG. 17G). Since the Ar ions sputter $SiO_2$ molecules constituting the transparent substrate 8a consisting of glass, the $SiO_2$ molecules are removed from the transparent substrate 8a. The transparent substrate 8a is set between electrodes 520 and 521 arranged in an Ar gas atmosphere to oppose each other, and a high-frequency signal is applied across the electrodes 520 and 521. The Ar gas is thus ionized to etch the exposed portions of the transparent substrate 8a.

The etching of the exposed regions may be attained by reactive ion etching (RIE). When the RIE is used, the transparent substrate 8a is set between the electrodes 520 and 521 arranged in a reactive gas atmosphere to oppose each other, and a high-frequency signal is applied across the electrodes 520 and 521. The reactive gas then produces a plasma to etch the exposed portions of the transparent substrate 8a.

The reactive gas used here contains $C_3H_8$ gas. This reactive gas may further contain $CCl_4$.

Figure 17H:
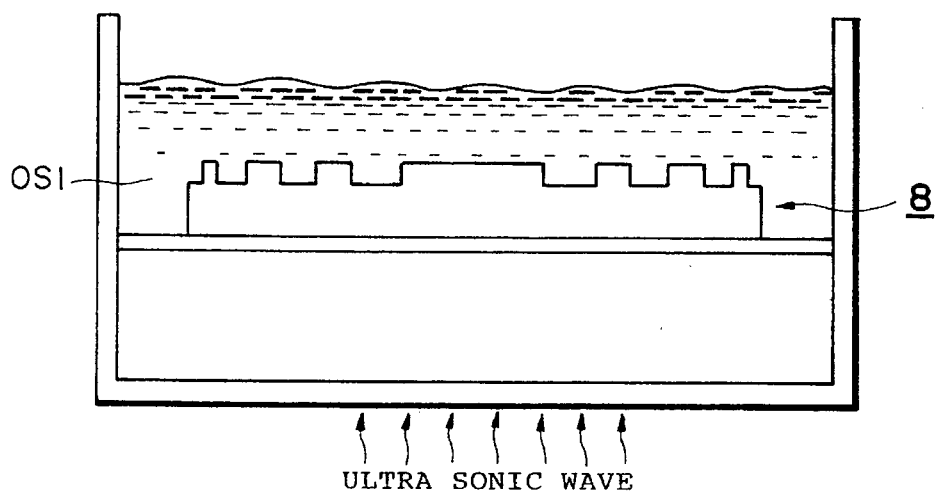

The substrate 8 is dipped in the organic solvent OS1 such as Tricrene, acetone, or the like to remove the resist 8b from the substrate 8a (see FIG. 17H). Upon removal of the resist 8b, an ultrasonic wave is applied to the substrate 8.

Figure 17I:
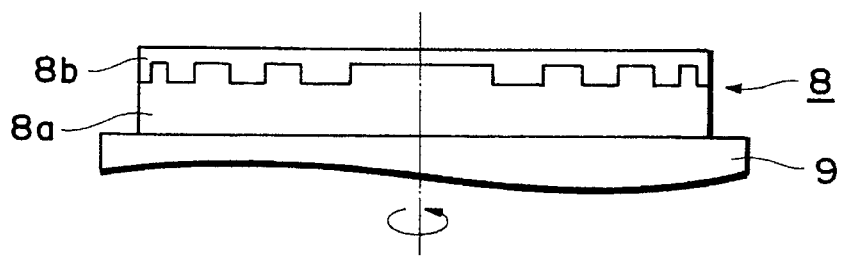

The resist 8b is coated again on the transparent substrate 8a having the diffraction grating (see FIG. 17I). The resist 8b is coated on the transparent substrate 8a while rotating the transparent substrate 8a.

Figure 17J:
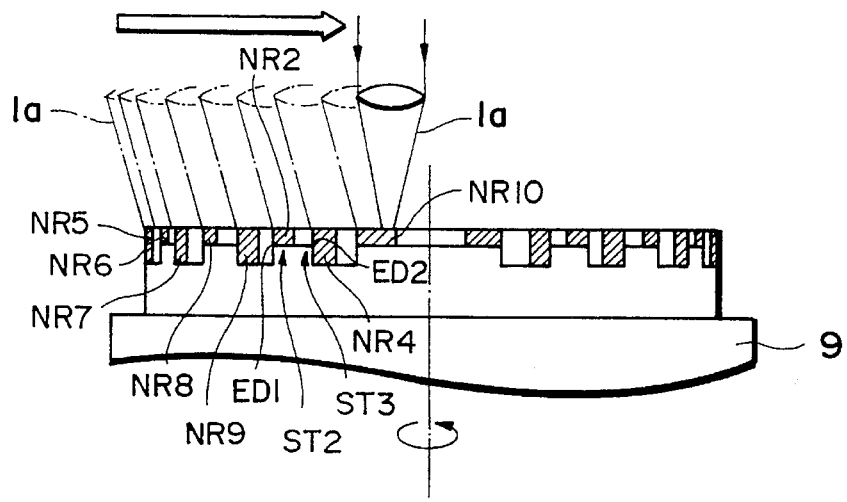
Figure 18:
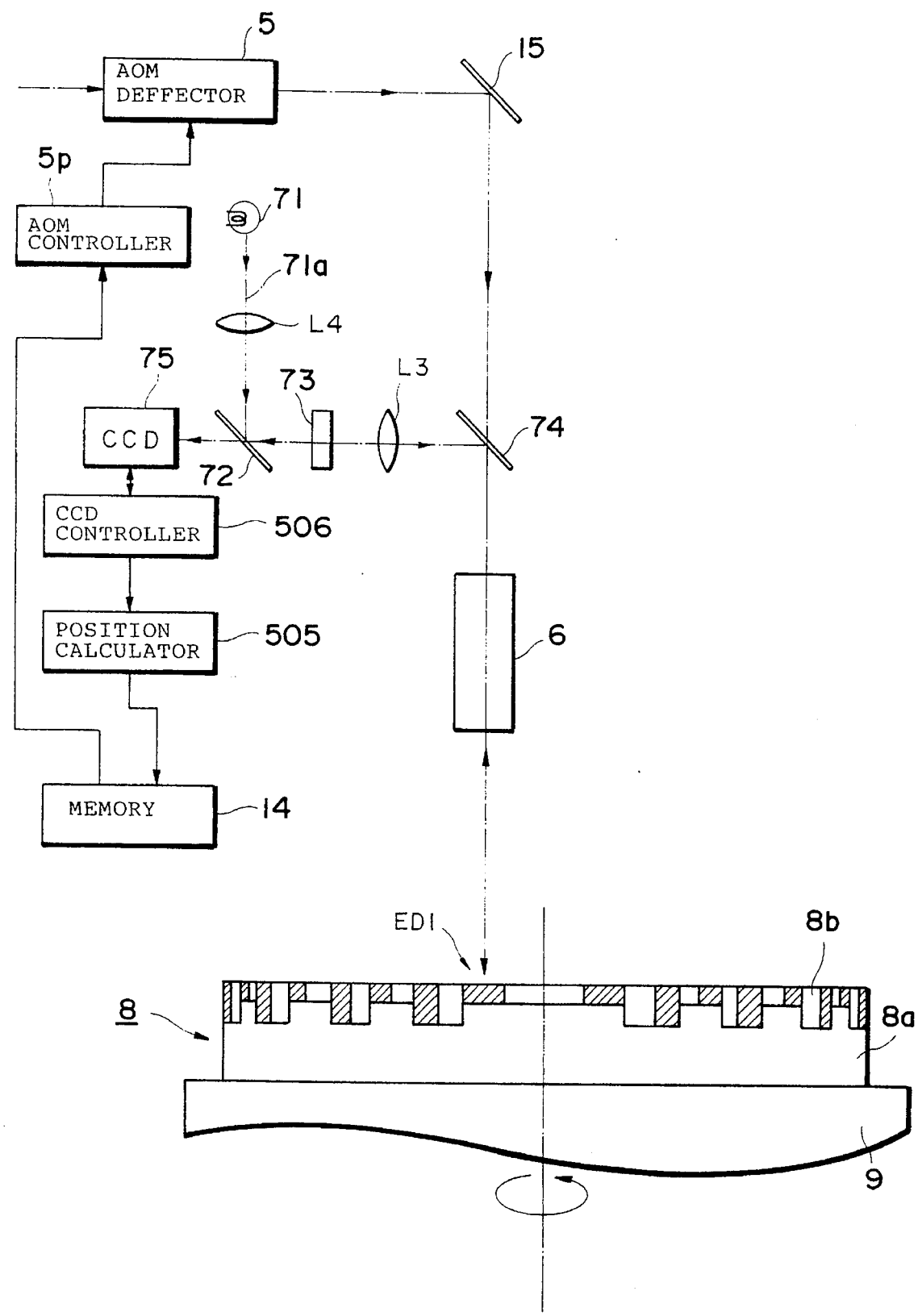
FIG. 18 is a schematic view showing principal part of the apparatus shown in FIG. 15.

Then, the exposure beam 1a is irradiated onto a predetermined region of the resist 8b coated on the transparent substrate 8a with the diffraction grating constituted by a plurality of step portions while rotating the substrate 8, thereby exposing the predetermined region (see FIG. 17J). More specifically, the lighting light 71a is irradiated onto the edge ED1 of the step portion ST2 of the transparent substrate 8a via the resist 8b while rotating the transparent substrate 8a, thereby observing an image of the edge ED1 using the image pickup device 75 (see FIG. 18). The position calculator 505 calculates the position of the edge ED1 on the basis of the output from the image pickup device 75. The exposure beam 1a is irradiated onto the portion NR2, on a region neighboring the edge position ED1, of the resist 8b, on the basis of the calculation result while rotating the transparent substrate 8a.

The irradiation of the exposure beam 1a onto the resist 8b is stopped, and the objective lens 6 is moved relative to the substrate 8 so as to expose the resist 8b on the region NR4 neighboring the already exposed region NR2. Thereafter, lighting light 71a is irradiated onto the second edge ED2 of the step portion ST3 of the transparent substrate 8b via the resist 8b while rotating the transparent substrate 8a, thereby observing an image of the second edge ED2 using the image pickup device 75. The position calculator 505 calculates the position of the second edge ED2 on the basis of the output from the image pickup device 75. Based on the calculation result, the exposure beam 1a is irradiated onto the portion NR4, on the region neighboring the second edge position ED2 of the substrate 8a, of the resist 8b while rotating the transparent substrate 8a. Note that other regions NR5 to NR9 of the resist 8 are exposed by the same method as for these regions NR2 and NR4.

Figure 17K:
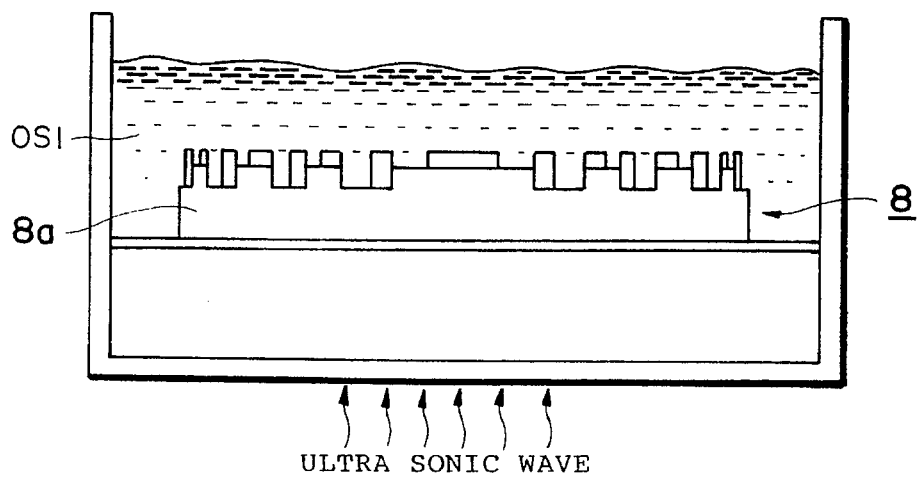

The substrate 8 having the resist 8b with the locally exposed regions NR2, NR4, and NR5 to NR10 is dipped in an organic solvent OS1 such as Tricrene, acetone, or the like to remove the exposed regions of the resist 8b from the transparent substrate 8a (see FIG. 17K). Upon removal, an ultrasonic wave is applied to the substrate 8.

Figure 17L:
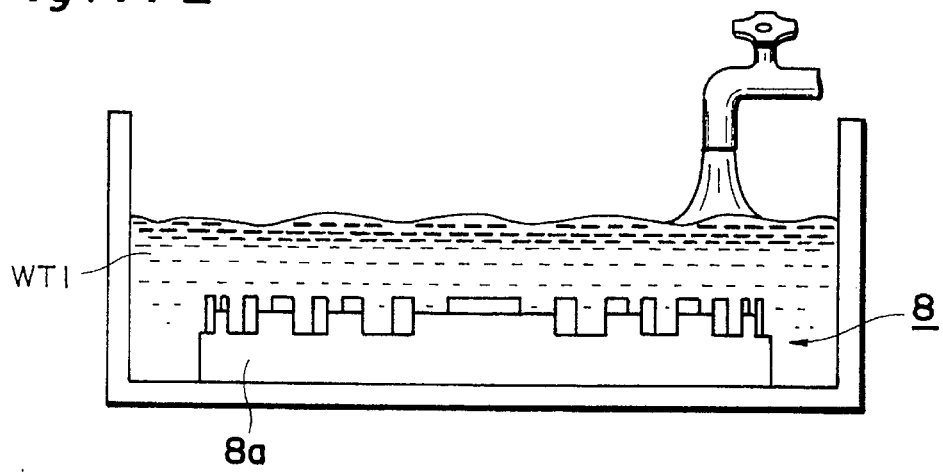

Subsequently the substrate 8 is washed with water WT1 (FIG. 17L).

Figure 17M:
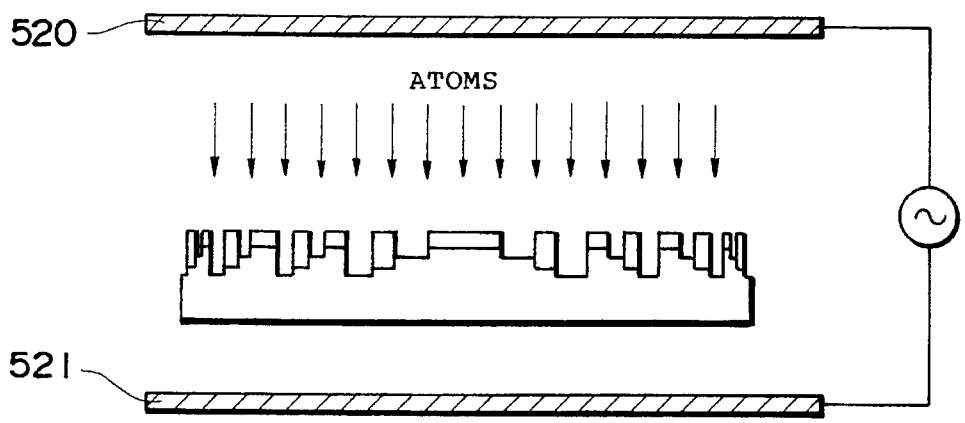

The exposed regions of the transparent substrate 8a coated with the resist 8b are etched by irradiating Ar ions onto these regions (see FIG. 17M). Since the Ar ions sputter $SiO_2$ molecules constituting the transparent substrate 8a consisting of glass, the $SiO_2$ molecules are removed from the transparent substrate 8a. The transparent substrate 8a is set between the electrodes 520 and 521 arranged in an Ar gas atmosphere to oppose each other, and a high,frequency signal is applied across the electrodes 520 and 521. The Ar gas is thus ionized to etch the exposed portions of the transparent substrate 8a.

The etching of the exposed regions may be attained by reactive ion etching (RIE). When the RIE is used, the transparent substrate 8a is set between the electrodes 520 and 521 arranged in a reactive gas atmosphere to oppose each other, and a high-frequency signal is applied across the electrodes 520 and 521. The reactive gas forms a plasma to etch the exposed portions of the transparent substrate 8a.

The reactive gas used here contains $C_3H_8$ gas. This reactive gas may further contain $CCl_4$.

Figure 17N:
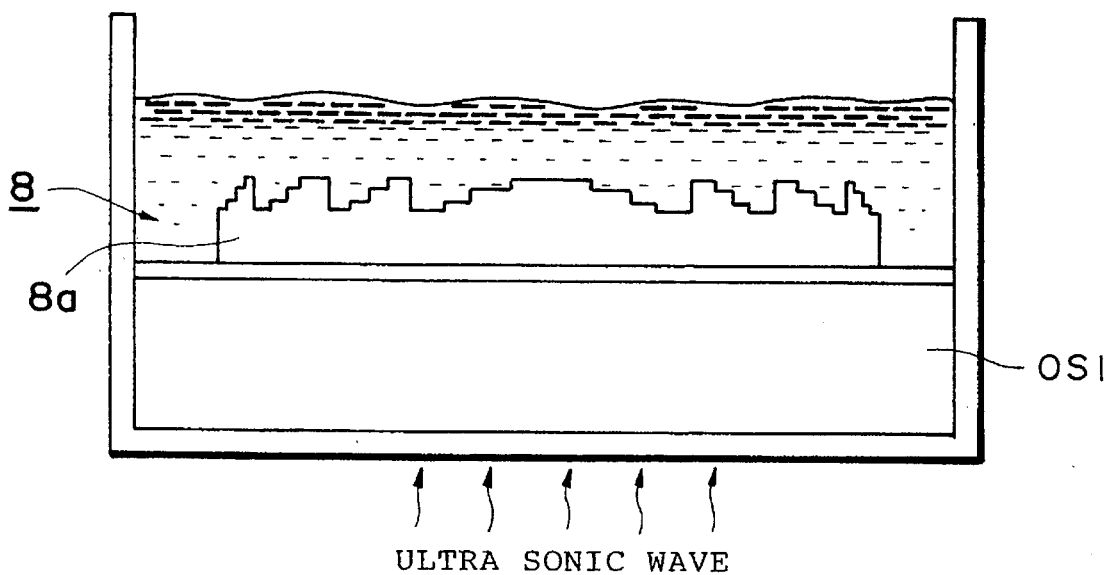

The substrate 8 is dipped in the organic solvent OS1 such as Tricrene, acetone, or the like to remove the resist 8b from the substrate 8a (see FIG. 17N). Upon removal of the resist 8b, an ultrasonic wave is applied to the substrate 8.

Figure 17O:
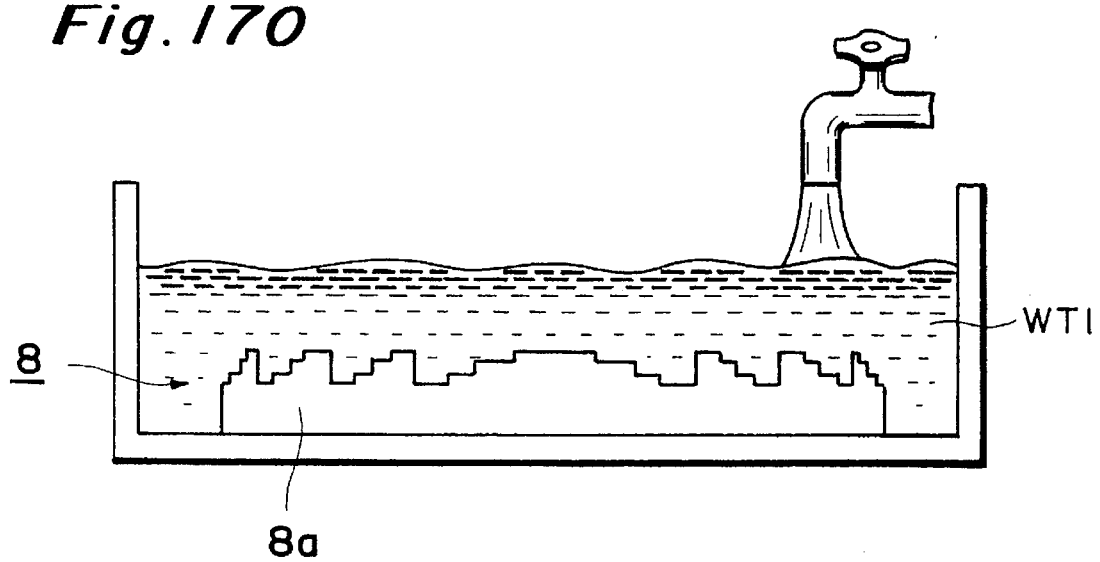

Finally, the transparent substrate 8a formed with a plurality of steps is washed with water WT1 (see FIG. 17O).

As described above, according to this method, since the position of the edge ED1 is detected, and thereafter, the exposure beam 1a is irradiated onto the region NR2 neighboring the edge ED1, a diffraction optical element 8a with a precision pattern can be consequently manufactured.

In the above method, a positive resist is used as the resist 8b. Alternatively, a negative resist may be used. In terms of the resolution and contrast, the positive resist is superior to the negative resist. When the positive resist is used, the region, irradiated with the exposure beam 1a, of the resist is removed.

(Second Embodiment)

An apparatus according to the second embodiment of the present invention will be briefly described below.

Figure 10A:
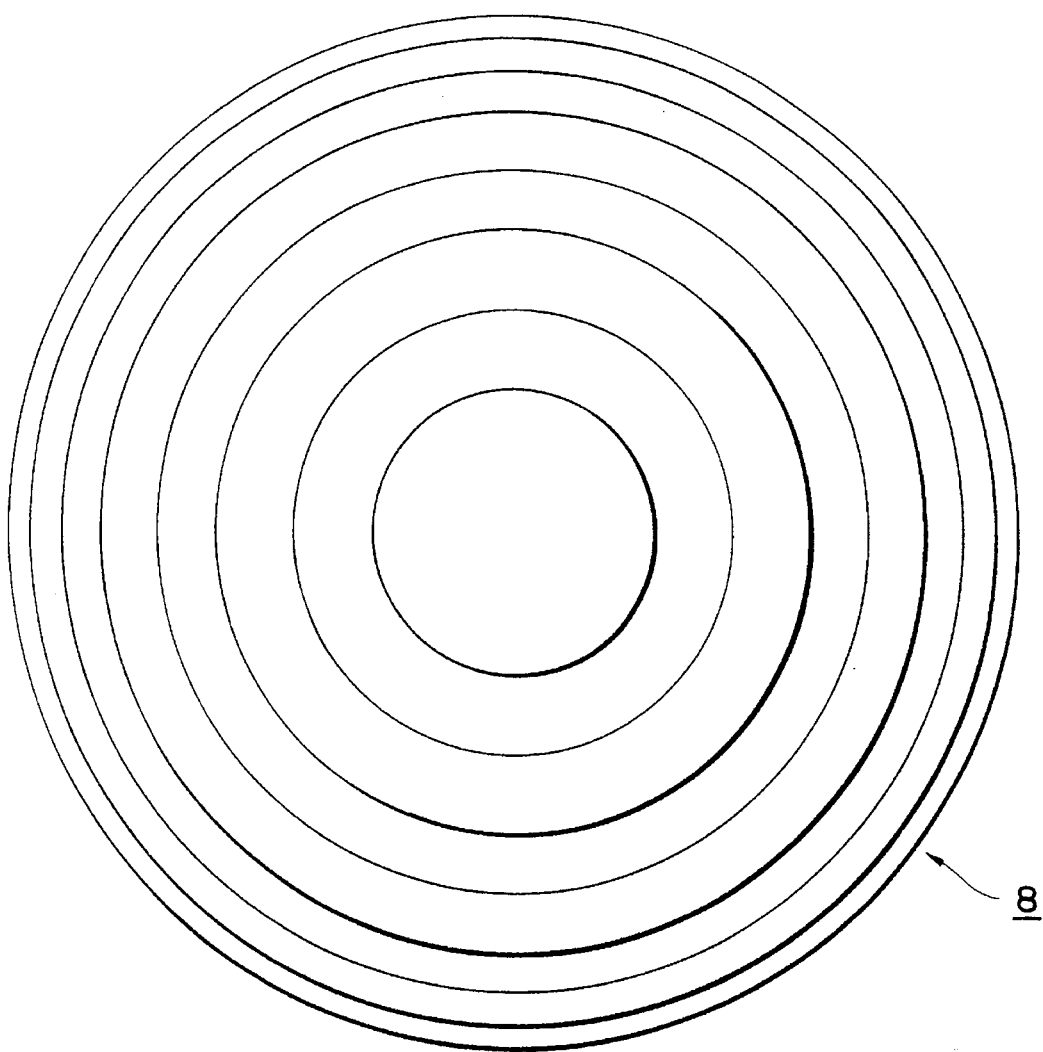
FIG. 10A is a plan view of a zone plate.
Figure 10B:
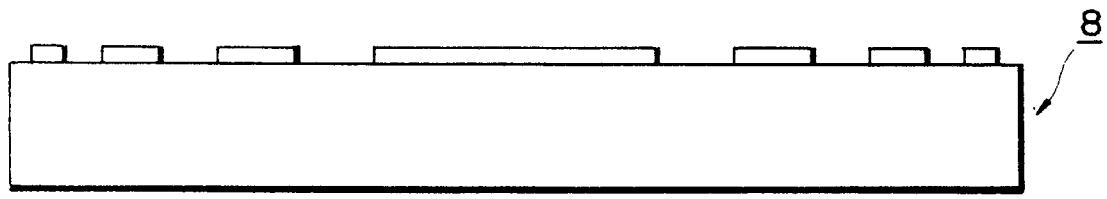
FIG. 10B is a side view of the zone plate shown in FIG. 10A.
Figure 11A:
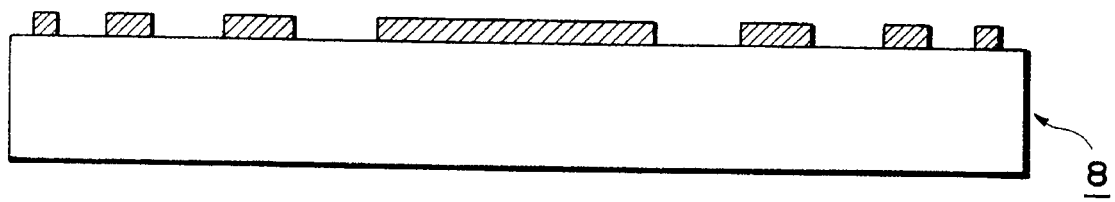
FIGS. 11A to 11C are views for explaining a method of manufacturing a zone plate.
Figure 11B:
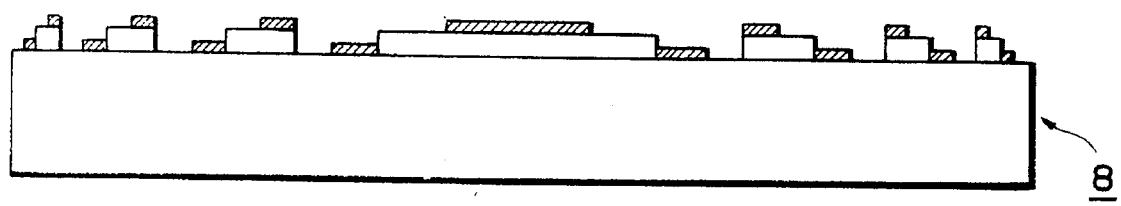
Figure 11C:
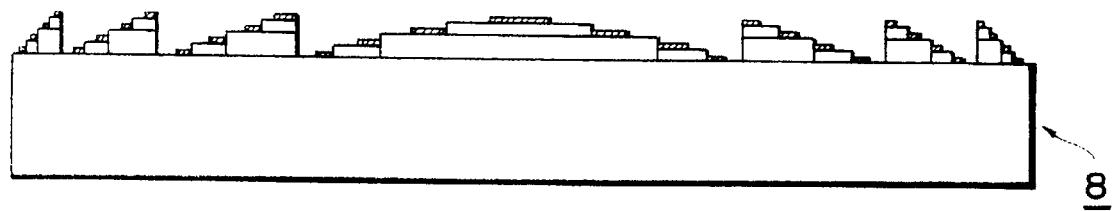

As a conventional zone plate, a Fresnel zone plate which has a structure constituted by arranging concentric circular light-shielding members on a light-transmitting substrate, as shown in FIGS. 10A and 10B, is known. Also, as shown in FIGS. 11A, 11B, and 11C, a so-called binary optics (BOE) in which concentric circular regions with different transmission characteristics (refractive indices, transmission distances, and the like) are arranged stepwise (to have a staircase sectional shape) to locally vary the transmission distance of a light beam incident on the element, so as to obtain a diffraction effect, is proposed.

The manufacturing process of such a zone plate will be briefly explained below. A substrate coated with a photoresist is placed on a rotary stage, and the rotary stage is rotated while a laser beam is focused and irradiated onto a desired position on the substrate as a small spot using an objective lens. Since the substrate rotates upon rotation of the rotary stage, the focused light spot formed on the substrate irradiates the substrate to draw an annular shape to have the center of rotation as the center.

Since the photoresist of the portion, irradiated with the laser beam, on the substrate is exposed in an annular shape, the annular pattern can be obtained by subsequently performing etching. At this time, when the focusing position of the small spot is moved in the radial direction, an annular pattern region having a line width larger than the focused light spot width can be formed.

After one annular exposure region is formed, the exposure is stopped, and the focusing position of the small spot is moved by a predetermined amount in the radial direction of the exposure region. The exposure is started again and the rotary stage is rotated. Thus, a new annular exposure region having the same center as but a different diameter from the above-mentioned annular exposure region is formed.

At this time, by precisely monitoring the focusing position of the small spot using a laser distance measuring unit, a high-precision concentric circular pattern is obtained. Of course, the width of the new annular exposure region can also be adjusted depending on the moving distance of the focusing position of the small spot.

Such an operation is repeated a plurality of number of times to form a plurality of concentric circular exposure regions. Thereafter, the substrate is subjected to a predetermined development treatment, and is also subjected to a process such as etching, as needed, thus obtaining a zone plate formed with a pattern defined by a transmission region (or defined by both transmission and non-transmission regions) with steps depending on the presence/absence of the etching process.

Thereafter, the process of coating a photoresist to form annular exposure regions on both the portions with and without the patterns, and executing etching is repeated a plurality of number of times, thus obtaining a zone plate with a structure defined by a plurality of steps of transmission regions (with a staircase section) such as a BOE.

Since the zone plate with the annular patterns is formed by combining a plurality of annular patterns having different diameters and line widths, and in particular, since the BOE has a staircase section, annular exposure regions corresponding to various pattern widths must be formed in accordance with the design conditions of zone plates.

Figure 12:
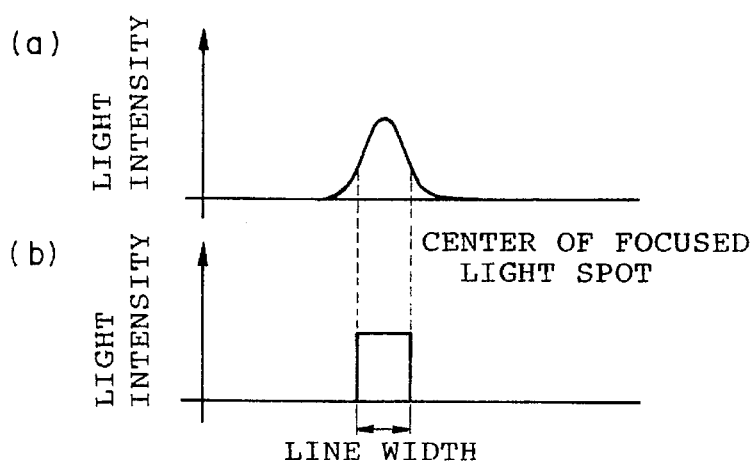
FIGS. 12 to 14 are graphs showing the relationship between the spatial width and the light intensity of an exposure beam.
Figure 13:
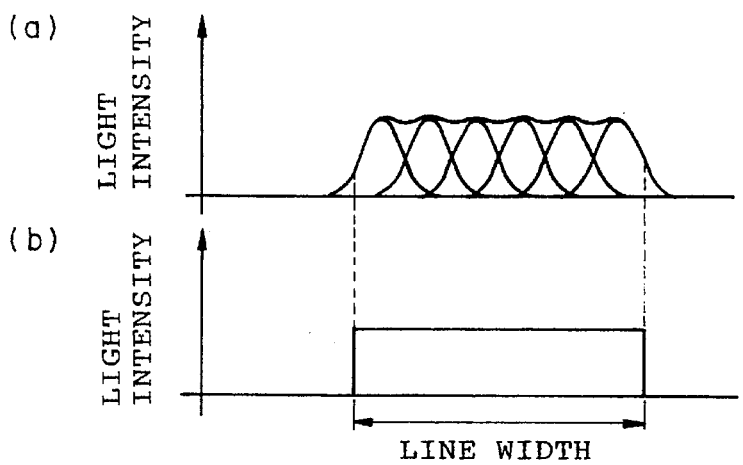

The light intensity in the focused light spot of a laser beam normally has a Gaussian distribution, and the line width obtained using this focused light spot is as shown in FIGS. 12(a) and 12(b). Upon exposure using the focused light spot with this light intensity, when an annular exposure region with a large line width is to be obtained, the line width can be adjusted by superposing the focused light spot while shifting its position at predetermined intervals, as shown in FIGS. 13(a) and 13(b).

Figure 14:
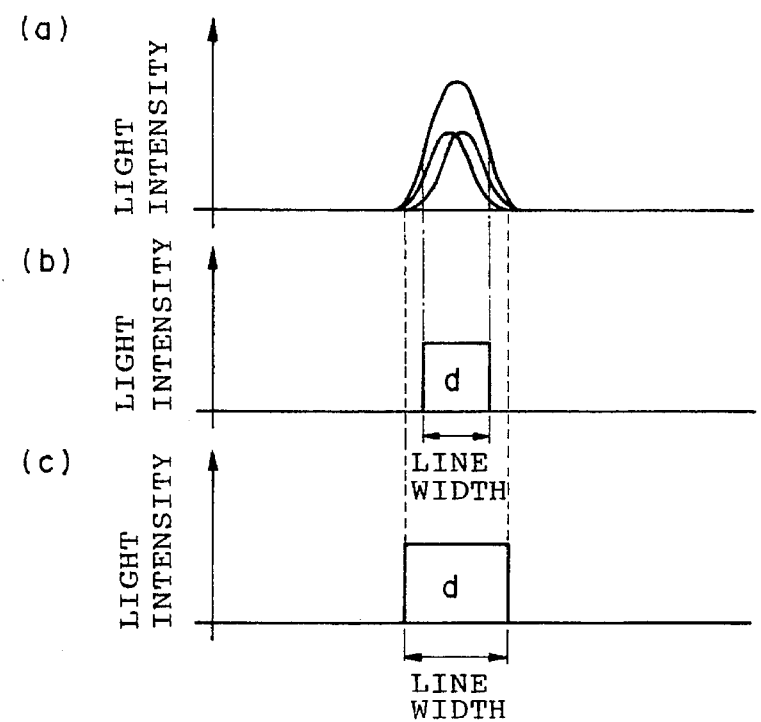

However, when an exposure region with a line width slightly larger than that obtained by a single focused light spot is to be obtained, since the two focused light spots overlap each other at neighboring positions, the light intensity of the edge portion undesirably increases, as shown in FIGS. 14(a), 14(b), and 14(c). For this reason, a line width d' of the formed exposure region (exposed region) undesirably becomes larger than a required size (line width) d.

As a result, the exposure pattern of the finally obtained zone plate deviates from an initially designed one. For this reason, the obtained zone plate has low diffraction efficiency. Furthermore, the use of this zone plate results in an increase in scattered light and stray light and generation of wavefront aberration.

In order to change the focused light diameter, the magnification of the projection optical system may be changed or the focused light position may be shifted from the focal point position. In this case, the arrangement of the optical system is complicated, and generation of various aberrations upon zooming and a change in focal depth occur. As a result, focusing precision is lowered, and a sharp edge cannot be formed.

The apparatus of the second embodiment has been achieved in consideration of the above-mentioned problems. Thus, the second embodiment obtains a zone plate manufacturing apparatus which can precisely expose (draw) designed concentric circular patterns, and in particular, obtains a zone plate manufacturing apparatus which can preform exposure with high precision when an exposure region with a line width slightly larger than a minimum line width (the diameter of the focused light spot) exposed using the focused light spot in the conventional apparatus is to be obtained.

According to this apparatus, a zone plate manufacturing apparatus comprises a rotary table on which an object to be worked is placed, exposure means for irradiating a predetermined light beam onto the surface of the object to be worked, and moving means for moving the irradiation position of the exposure means at least in a direction perpendicular to the central axis of rotation of the rotary table, and forms an annular exposure region on the object to be worked by performing exposure on the object to be worked which is being rotated so as to form concentric circular patterns on the object to be worked. The exposure means includes aperture stop means for limiting the effective diameter of the light beam emitted by a light source, and an exposure optical system which is arranged to project the aperture pattern of the aperture stop means onto the irradiation position.

The aperture stop means of the zone plate manufacturing apparatus comprises a variable aperture stop whose aperture pattern can be varied.

The aperture stop means comprises a variable slit whose aperture pattern can be varied.

This apparatus further comprises aperture adjusting means for adjusting the aperture pattern of the aperture stop means in correspondence with the size of a predetermined exposure region.

The exposure means includes the aperture stop means for limiting the effective diameter of the light beam emitted by the light source, and the exposure optical system which is arranged to project the aperture pattern of the aperture stop means onto the irradiation position.

In this apparatus, the light beam emitted by the light source is converted into a light beam having an effective diameter corresponding to the aperture pattern of the aperture stop means, and is irradiated by projecting this aperture pattern onto the surface of the object to be worked.

Since this aperture stop means limits the effective diameter of the light source light beam, it can cut light beam components corresponding to a low-intensity portion (the skirt portion Gaussian distribution) as marginal light components of a light beam with the Gaussian distribution, and can expose even a peripheral portion in the irradiation region while maintaining a predetermined intensity. In addition, a spot portion outside this irradiation region has an extremely low irradiation intensity.

For this reason, since the difference between the irradiation states (irradiation light amounts) at the edge portion of the exposure region (a boundary between the edge portion of the irradiation region and a portion outside the region), a sharp edge portion can be formed. In particular, in order to form an annular exposure region with a line width slightly larger than the focused light spot diameter, even when exposure is performed again while shifting the exposure position after at least one revolution of the rotary table, since the edge portion of one irradiation region does not influence the edge portion of the other irradiation region, an annular exposure region with a desired fine line width can be precisely obtained.

More specifically, in the conventional apparatus, in order to obtain a line width larger than the focused light spot diameter, an exposure region with a desired line width is formed by moving the focused light spot to have a locally overlapping region, i.e., by superposing two annular exposure regions. In this case, when an exposure region with a line width slightly larger than the minimum spot diameter is to be formed, a desired line width cannot be obtained.

Such a problem is not so serious when a region having a line width considerably larger than the focused light spot diameter is to be formed, as shown in FIGS. 13(a) and 13(b), but has a serious influence when a line width slightly larger than a single focused light spot is to be obtained. However, according to the present invention, since the two exposure regions do not influence each other at this edge portion, a required line width can be precisely formed.

Since the aperture stop means of this apparatus has a variable aperture pattern, the size of the aperture pattern projected onto the object to be worked changes. For this reason, the focused light spot diameter changes in correspondence with the change in size of the aperture pattern.

According to the present invention, it is preferable to temporarily increase the effective diameter of a light beam emitted by the light source, and thereafter, to convert the light beam into one with an effective diameter corresponding to the aperture pattern of the aperture stop means. This is to expand the effective diameter of the light source light beam, and is effective for expanding the focused light spot diameter or forming a reduced-size spot by changing the aperture pattern.

In this apparatus, the focused light spot diameter can be changed by changing the aperture pattern of the aperture stop means in correspondence with a line width slightly larger than that obtained by the minimum focused light spot so as to adjust the focused light spot to one with an appropriate width. For this reason, a precise annular exposure region can be formed.

Figure 9A:
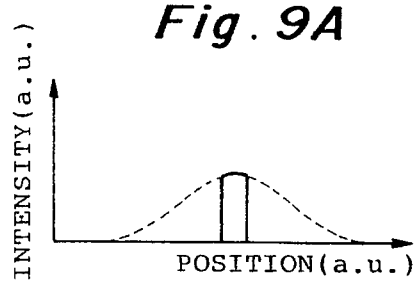
FIGS. 9A to 9F are graphs for explaining changes in exposure beam shape.
Figure 9D:
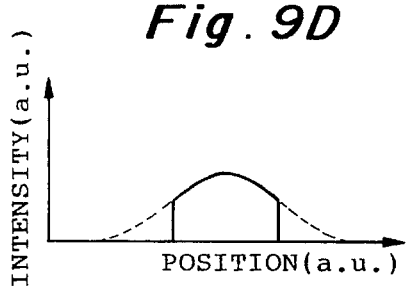
Figure 9B:
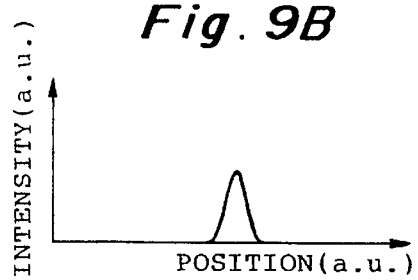
Figure 9E:
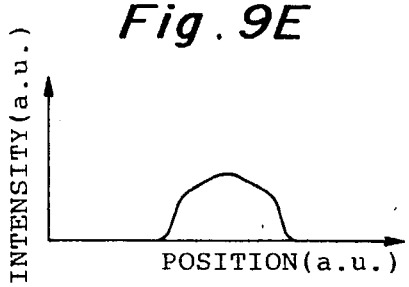
Figure 9C:
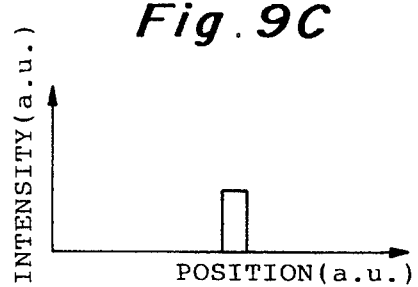
Figure 9F:
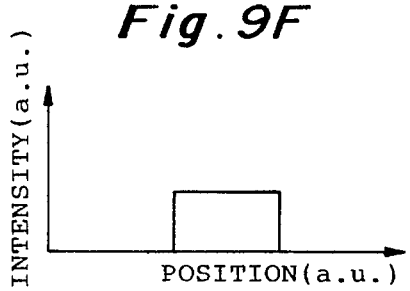

FIGS. 9A to 9F show this state. FIGS. 9A to 9F are explanatory views showing the light intensity and the line width obtained when the diameter of the light beam emitted by the light source is temporarily widened, and thereafter, the diameter of the focused light spot (the width of the exposure region) is adjusted using the aperture stop means. FIGS. 9A to 9C show a case wherein the line width is decreased, and FIGS. 9D to 9F show a case wherein the line width is increased.

In this manner, when the diameter of the light beam emitted by the light source is temporarily. widened, the amount of light per unit area becomes smaller than that used as the focused light spot. However, light beams obtained via a slit have substantially equal amounts of light per unit area at the irradiation position independently of the size of the aperture portion. For this reason, exposure irradiation regions with different line widths can be formed at the same rotational speed.

Like in the prior art, when the exposure amount is insufficient, the rotational speed of the rotary table may be lowered, or the rotary table may be rotated by a plurality of number of times so as to prolong the irradiation time on the object to be worked, thereby assuring a required exposure amount.

When the line width is considerably larger than the focused light spot diameter, an appropriate focused light spot diameter may be selected, and the focused light spot is exposed and irradiated while moving its irradiation position to have a locally overlapping region like in the prior art. In this manner, by superposing a plurality of exposure regions, an exposure irradiation region with a large line width can be formed.

In particular, since a zone plate pattern such as a BOE is constituted by combining a plurality of annular exposure regions with different diameters and line widths, if the aperture pattern of the aperture stop means is fixed, the aperture stop means must be exchanged in correspondence with the annular pattern to be exposed, or exposure irradiation must be performed a plurality of number of times even for a slight difference in line width.

However, since such an operation lowers the throughput, a large number of annular exposure regions with different diameters and line widths can be continuously quickly formed by using the variable aperture stop whose aperture pattern can be changed in correspondence with a required line width as the aperture stop means.

The variable aperture stop means need only adjust at least the line width of an annular exposure region, in other words, need only adjust the diameter, in the radial direction, of the projected pattern of the aperture pattern onto the object to be worked, and its pattern can be either a circular or slit shape, i.e., is not particularly limited.

In general, in order to form an exposure region, a certain light amount is required, and a decrease in light amount loss upon exposure leads to improvement of the throughput. For example, when a variable aperture stop having a circular aperture pattern is used, since the circular aperture limits light not only in the line width direction but also in the rotation direction, the absolute amount of exposure light is unnecessarily decreased.

In contrast to this, when a variable aperture stop with a slit-like aperture pattern is used, the line width of an annular exposure region is determined in correspondence with the width, in the line width direction, of the slit. For this reason, when a slit with a large aperture size to be projected in the rotation direction (circumferential direction) is used, the light amount limitation in the rotation direction is suppressed to prevent the exposure light from being unnecessarily limited. For this reason, the light amount loss can be suppressed.

Since the aperture adjusting means adjusts the aperture pattern of the aperture stop means, exposure irradiation can be performed with an appropriate focused light spot diameter corresponding to the line width of each pattern of a required zone plate.

For example, when a line width according to the focused light spot diameter within the variable range of the aperture stop is to be obtained, the aperture size of the aperture stop is adjusted to obtain a focused light spot diameter corresponding to the required line width.

When the full aperture size of the aperture stop is smaller than a required line width, locally overlapping exposure is performed a plurality of number of times by selecting an appropriate focused light spot diameter. In this case, the focused light spot diameter is changed in correspondence with a required line width, thereby reducing the number of times of superpose exposure (e.g., the number of revolutions required for forming a single annular exposure region).

In order to achieve these operations, when means for inputting required design conditions, and selection means for automatically selecting an appropriate focused light spot diameter (the size of the aperture stop) on the basis of the input design conditions are arranged, and the aperture adjusting means is operated in cooperation with the rotary table and the moving means, high-precision concentric circular patterns (annular exposure regions) can be automatically formed in correspondence with the input design conditions.

The apparatus according to the second embodiment will be described in detail below with reference to the accompanying drawings.

In the following description, the same reference numerals in the second embodiment denote the same parts as in the first embodiment, and a repetitive description thereof will be avoided.

In order to manufacture a diffraction optical element with a precision pattern, the apparatus according to the second embodiment comprises an element 1005 for limiting the effective diameter of an exposure beam, as shown in FIGS. 8, 21, 22, and 23.

Since the intensity of an exposure beam 1a has a substantially Gaussian spatial distribution, it becomes weaker as the position is separated from the center of the beam. The exposure beam in the effective diameter has an intensity enough to expose a resist 8b.

When the effective diameter of the exposure beam is $R_0$, and a region of $2R_0$ is to be exposed, a half of this region is exposed by the exposure beam having the effective diameter $R_0$, and thereafter, the remaining half region is exposed again by the exposure beam having the effective diameter $R_0$. However, when a region of $1.1R_0$ is to be exposed, a portion of the region is exposed by the exposure beam having the effective diameter $R_0$, and thereafter, the remaining region is exposed by the exposure beam having the effective diameter $R_0$ to overlap a region of $0.9R_0$ with the exposure region, thus exposing the region of $1.1R_0$. However, it is impossible to achieve this. Since the irradiation positions of the exposure beam overlap each other, a region outside the effective diameter, which is not exposed by the single exposure, is undesirably exposed. Since the intensity distribution of the exposure beam is a substantially Gaussian distribution, light components outside the effective diameter of the exposure beam influence the resolution.

Thus, the apparatus of this embodiment comprises this element 1005 for limiting the effective diameter of the beam, and a beam expander 3.

The beam expander 3 is arranged on the optical path of the exposure beam 1a which propagates from a light source 1 to an objective lens 6, and expands the diameter of the exposure beam 1a incident thereon.

The element 1005 for limiting the effective diameter of the exposure beam 1a is arranged on the optical path of the exposure beam 1a which propagates from the beam expander 3 to the objective lens 6, and has an aperture 1005x whose size can be changed. The exposure beam 1a passes the aperture 1005x of this element 1005. Since the aperture 1005x limits the effective diameter of the exposure beam 1a, a precision pattern can be projected onto the resist 8b by adjusting the size of the aperture 1005x in correspondence with the region to be exposed.

This element comprises a base plate (substrate) 1005k, first, second, third, and fourth plates (shutter blades) 25a, 25b, 25c, and 25d, and first, second, third, and fourth actuators 1005a, 1005b, 1005c, and 1005d.

The base plate 1005k has an opening 1005p at its central portion. A first guide groove 1125a extending in a first direction, and second guide grooves 1125b extending in a second direction are formed on the base plate 1005k. The first shutter blade 25a has a first projection 725a which is slidably fitted in the first guide groove 1125a, and the second shutter blade 25b has second projections 725b which are slidably fitted in the second guide grooves 1125b. More specifically, the first and second shutter blades 25a and 25b are slidably attached to the substrate 1005k. The first direction is a direction perpendicular to the direction of thickness of the first plate 25a. The second direction is a direction perpendicular to both the direction of thickness of the second plate 25b and the first direction.

In other words, the first plate 25a is movable in the first direction, and covers a portion of the opening 1005p of the substrate 1005k. The second plate 25b crosses on the first plate 25a, is movable in the second direction, and partially covers another portion of the opening 1005p of the substrate 1005k. Therefore, the diameter of the exposure beam 1a is limited by the first and second plates 25a and 25b.

The first actuator 1005a is fixed to the substrate 1005k, and moves the first plate 25a in response to a signal from a controller 1006. The second actuator 1005b is also fixed to the substrate 1005k, and moves the second plate 25b in response to a signal from the controller 1006. Note that the aperture 1005x of the element 1005 is defined by the four plates 25a, 25b, 25c, and 25d including the first and second plates 25a and 25b, and these plates are movable in directions perpendicular to their direction of thickness. More specifically, the third shutter blade 25c is movable in the first direction by the actuator 1005c, and the fourth shutter blade 25d is movable in the second direction by the actuator 1005d. The third blade 25c has a projection 725c which is slidably fitted in a groove 1125c, and the fourth blade 25c has a projection 725d which is slidably fitted in at least one of grooves 1125d.

These shutter blades 25a, 25b, 25c, and 25d are electrically connected to the controller 1006 via wiring lines 1105a, 1105b, 1105c, and 1105d, and are controlled by the controller 1006.

More specifically, when the exposure beam 1a with a predetermined line width is to be irradiated onto the resist 8b, a system controller 503 outputs information of this line width to the aperture element controller 1006. The controller 1006 controls the actuators 1005a, 1005b, 1005c, and 1005d on the basis of the input information.

The apparatus of the second embodiment will be described in more detail below.

Figure 21:
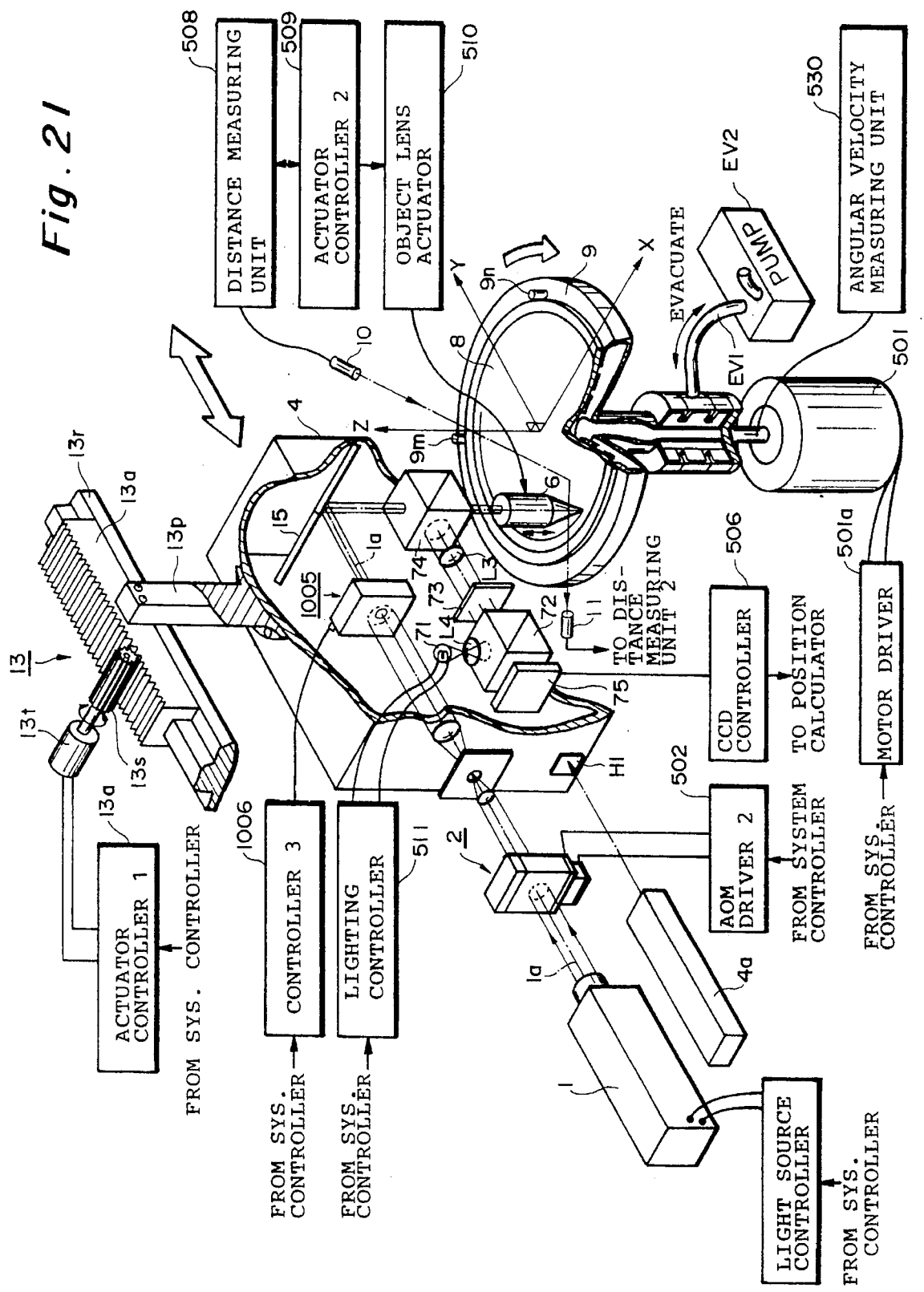
FIG. 21 is a perspective view for explaining the apparatus shown in FIG. 7 in more detail.
Figure 23:
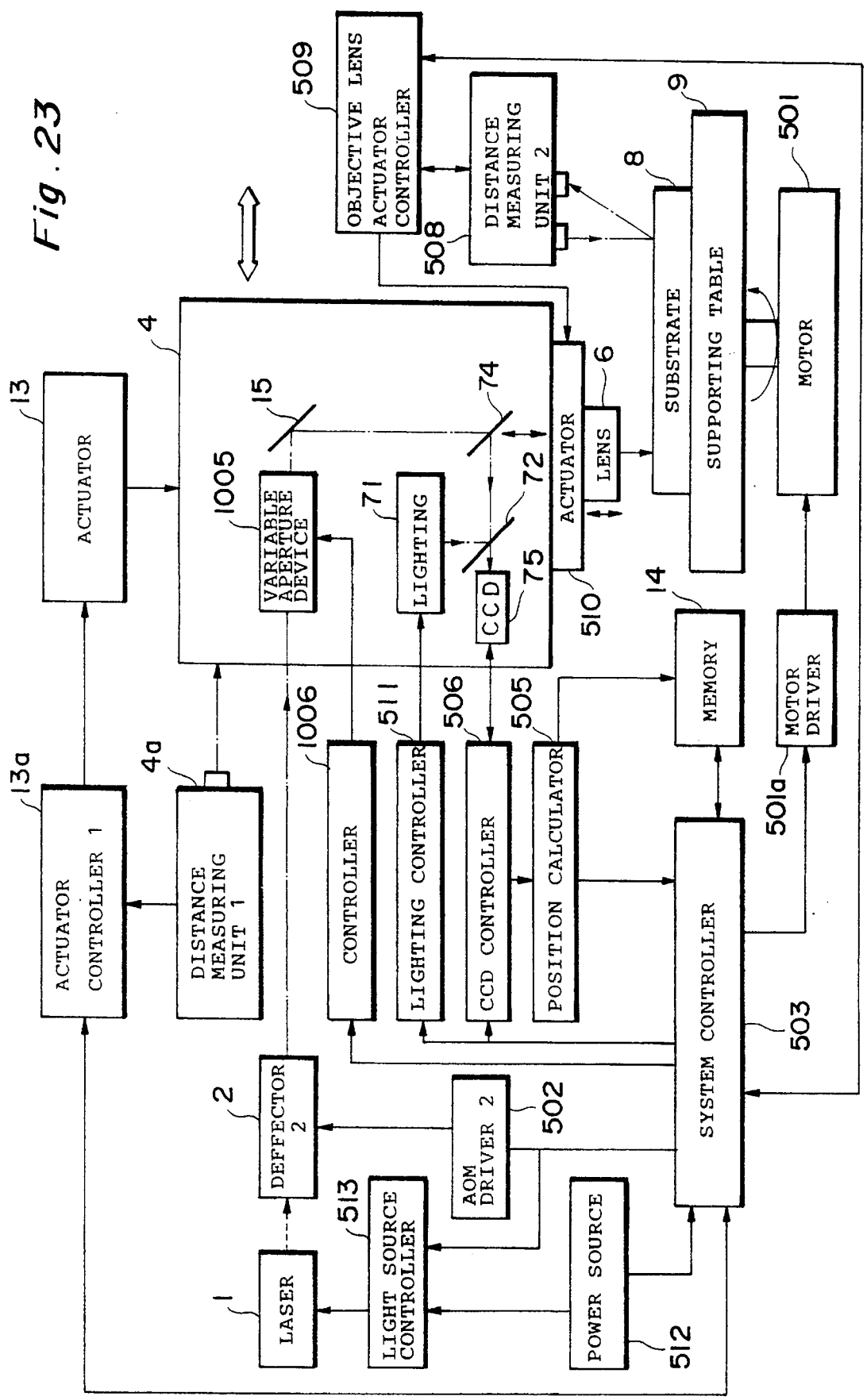
FIG. 23 is a block diagram for explaining the control of the apparatus of the second embodiment.

FIGS. 17, 21, and 23 show the schematic arrangement of a zone plate manufacturing apparatus according to the second embodiment of the present invention. In this embodiment, a laser beam emitted by the Ar laser light source 1 and having a wavelength of 365 nm is used as the exposure beam. A substrate 8 coated with a resist film and serving as an object to be worked is placed on a rotary stage 9, and is rotated upon rotation of the rotary stage 9. A light beam emitted by the laser light source 1 is focused on this substrate. By exposing the substrate in an annular pattern by the focused light irradiation and the rotation, an annular exposure region is formed.

The intensity of the light beam emitted by the laser light source 1 is adjusted to a desired value by a modulator 2, and the adjusted light beam emerges from the modulator 2. The light beam emerging from the modulator 2 is incident on the beam expander 3, and its beam diameter is temporarily expanded by the beam expander 3. The expanded light beam illuminates the variable aperture 1005. The slit width of the variable aperture 1005 can be varied within a range from 20 μm to 2 mm. Thus, the variable aperture 1005 limits the effective diameter of the incident light beam, and also adjusts the diameter of the focused light spot focused on the substrate.

The light beam passing the aperture is incident on the objective lens 6, and is focused on the substrate 8. Since the objective lens 6 used in this embodiment reduces the incident light beam to 1/100, and projects the light beam onto the substrate in a reduced scale, the light beam which is converted by the variable aperture 1005 to have a diameter falling within a range from 20 μm to 2 mm is reduced to a light beam to 1/100, i.e., to have a diameter falling within a range from 0.2 μm to 20 μm by the objective lens 6, and the reduced light beam is projected onto the substrate 8 coated with the resist. Since the substrate 8 is rotated upon rotation of the rotary stage 9, the light beam is irradiated onto the substrate 8 in an annular pattern having the same width as the focused light spot diameter in the radial direction.

Note that a focal point (substrate vertical position) detector constituted by an LED 10 and a position sensor 11 detects the position of the substrate 8, and automatically moves the objective lens 6 (or the rotary stage 9) vertically, so that the focal point is always adjusted in correspondence with the vertical displacement of the substrate 8. On the other hand, a position detection optical system 7 detects the position of the already formed pattern to check the relative positional shift of a new position to be exposed with the focused light (where a new pattern is to be formed) and to detect the laser beam irradiation position.

Furthermore, the variable aperture 1005, the objective lens 6, the position detection optical system 7, and the focal point (substrate vertical position) detector constituted by the LED 10 and the position sensor 11 are assembled in a single head 4. Also, an actuation controller 12 for moving the head 4 in a direction perpendicular to the central axis of rotation of the rotary stage is arranged. Note that the controller 12 described above comprises the controllers and drivers shown in FIGS. 15, 16, 21 and 23. The moving distance of the head 4 is precisely read by a laser interference distance measuring unit (not shown), and the read value is fed back to control the position of the head 4.

Since the line width of an annular exposure region to be formed on the substrate 8 is determined by the irradiation position on the substrate 8 (or the moving distance while irradiating the laser beam), the size of the variable aperture 1005 is preferably changed automatically in correspondence with the irradiation position of the laser beam. More specifically, since the diameter (in the radial direction) of the focused light spot can be varied within a range from 0.2 μm to 20 μm by adjusting the variable aperture, if the line width of the exposure region falls within this range, the exposure can be performed after the size of the aperture 1005 is adjusted to a required line width.

When the line width of the exposure region is insufficient even when the variable aperture 1005 is fully opened (e.g., when the line width exceeds 20 μm), an exposure region with a required line width can be formed by moving the irradiation position in the radial direction by a required amount in a partially overlapping exposure state while monitoring the position of the head 4 using a laser interference distance measuring unit (not shown).

Figure 8:
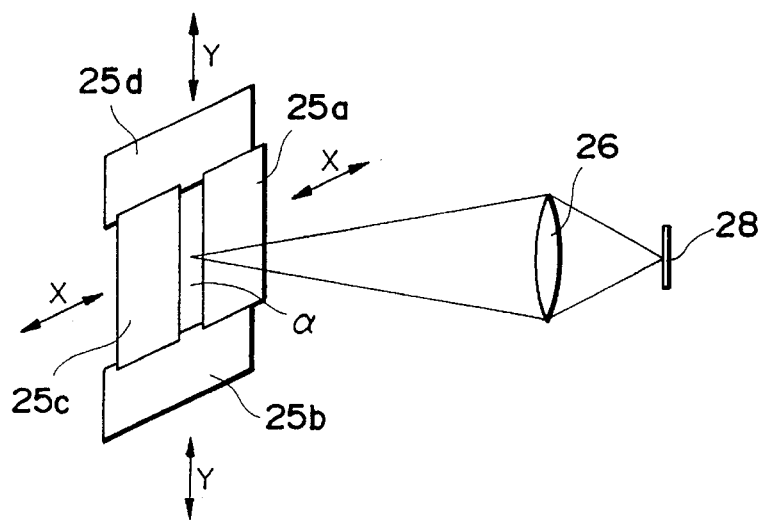
FIG. 8 is a perspective view showing a variable aperture stop element.
Figure 22:
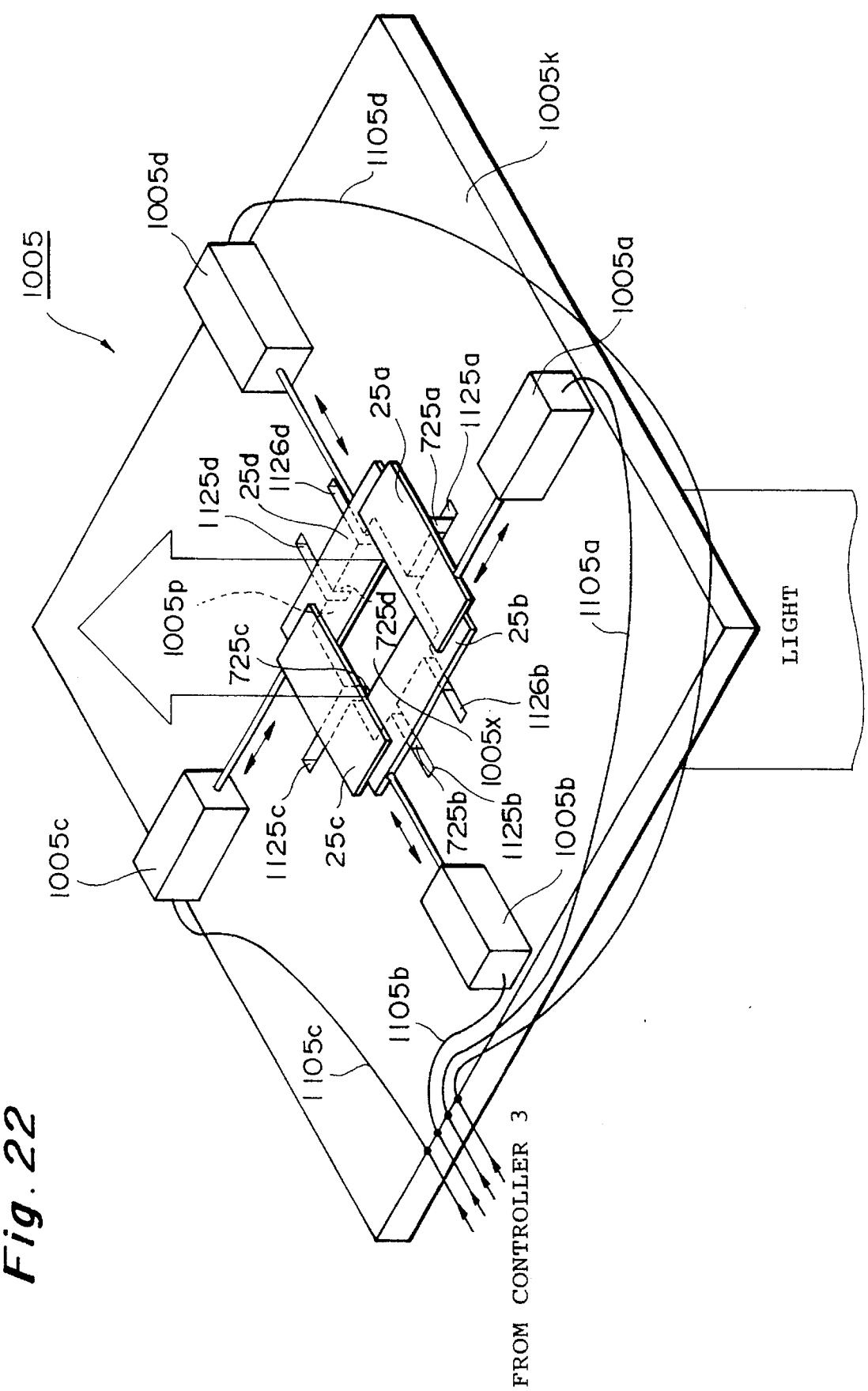
FIG. 22 is a perspective view for explaining the element shown in FIG. 8 in more detail.

FIGS. 8 and 22 are schematic views of the variable aperture 1005 used in this embodiment. This variable aperture 1005 comprises a variable slit constituted by the light-shielding plates 25a and 25c which are movable in the X-direction, and the light-shielding plates 25b and 25d which are movable in the Y-direction. By adjusting the moving amounts of these plates, the size of an aperture α is determined.

In order to assure the precision of the irradiation position on the substrate, one of the light-shielding plates (e.g., 25a or 25c) corresponding to a portion for forming a pattern edge on the substrate may be fixed in position, the two light-shielding plates (e.g., 25a and 25b) constituting two orthogonal sides of the aperture may be fixed in position, or the four light-shielding plates 25a, 25c, 25b, and 25d may be relatively moved while the center of the aperture always is kept at the same position.

In this embodiment, since the above-mentioned variable aperture stop means 1005 is arranged, even when a very small line width, a line width slightly larger than the very small line width, or a line width considerably larger than the focused light spot diameter is to be formed, an exposure region with a precise line width can be formed. Furthermore, when a so-called lithography process such as etching is performed based on this exposure region, a pattern with a precise line width can be formed.

As described above, according to the zone plate manufacturing apparatus of the present invention, designed concentric circular patterns can be precisely exposed independently of the line widths. Thus, a zone plate such as a BOE, which has high precision and uniform diffraction efficiency, can be obtained.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application Nos.170372/1994 filed on Jun. 30, 1994 and 170373/1994 filed on Jun. 30, 1994 are hereby incorporated by reference.

What is claimed is:

1. An apparatus for drawing concentric circular patterns on a photoresist coated on a substrate placed on a rotary table by irradiating an exposure beam emitted by a light source onto the photoresist, comprising:
   (a) an objective lens for guiding the exposure beam emitted by the light source toward a first region on the photoresist coated on the substrate;
   (b) a lighting light source for irradiating lighting light in a direction of the first region via said objective lens;
   (c) an image pickup device for picking up an image from the first region obtained via said objective lens;
   (d) a deflector for changing a propagating direction of the exposure beam; and
   (e) a controller for controlling said deflector on the basis of a signal input from said image pickup device.

2. An apparatus according to claim 1, further comprising a motor for rotating the rotary table.

3. An apparatus according to claim 1, wherein said deflector comprises an acoustooptic modulator arranged in an optical passage of the exposure beam which propagates from the light source to said objective lens.

4. An apparatus according to claim 1, further comprising:
   a) a mirror for reflecting the exposure beam emitted by the light source in a direction of said objective lens;
   b) a beam splitter arranged in an optical passage of the exposure beam which passes between said objective lens and said mirror, the exposure beam which is guided to said beam splitter from a direction of said mirror being transmitted or deflected through said beam splitter and being incident onto said objective lens, the lighting light emitted by said lighting light source being deflected or transmitted by said beam splitter and being incident onto said objective lens, the lighting light which is incident onto said beam splitter from a direction of the rotary table via said objective lens being deflected or transmitted by said beam splitter and being irradiated onto said image pickup device;
   c) a movable head which is fixed to said objective lens, said mirror, and said beam splitter, and is movable relative to the rotary table, and
   d) an actuator for moving said movable head.

5. An apparatus according to claim 4, further comprising:
   a) a laser distance measuring unit for detecting a position of said head; and
   b) an actuator controller for controlling said actuator on the basis of an output from said laser distance measuring unit.

6. An apparatus according to claim 1, wherein the image is an image of an edge of a step portion formed on a surface of the substrate, and
   said controller controls said deflector, so that the exposure beam is irradiated onto a photoresist portion coated on a predetermined region, adjacent to the edge, of the substrate.

7. An apparatus according to claim 1, further comprising:
   a) a focal point detector for measuring a distance between said objective lens and the photoresist;
   b) an actuator which can move said objective lens along a direction normal to the surface of the rotary table; and
   c) an auto focal point position controller for controlling said actuator on the basis of an output from said focal point detector.

8. An apparatus according to claim 1, further comprising a filter which is inserted in an optical passage of the lighting light between said lighting light source and said objective lens, and shields light in a wavelength range to which the photoresist is exposed.

9. An apparatus according to claim 1, wherein the image is an image of an edge of a step portion formed on a surface of the substrate, and
   said controller comprises a position calculator for calculating a position of the edge on the basis of an output from said image pickup device.

10. An apparatus according to claim 1, wherein
    a) the image is an image of an edge of a step portion formed on a surface of the substrate,
    b) said deflector comprises an acoustooptic modulator arranged in an optical passage of the exposure beam which propagates from the light source to said objective lens, and
    c) said controller comprises:
       a position calculator for calculating a position of the edge on the basis of an output from said image pickup device; and
       an AOM controller for controlling said acoustooptic modulator on the basis of an output from said position calculator, so that the exposure beam is irradiated onto a photoresist portion coated on a predetermined region, adjacent to the edge, of the substrate.

11. An apparatus according to claim 10, further comprising a memory for storing data of the position of the edge calculated by said position calculator.

12. An apparatus according to claim 1, wherein
    a) the image is an image of an edge of a step portion formed on a surface of the substrate,
    b) said deflector comprises an acoustooptic modulator arranged in an optical passage of the exposure beam which propagates from the light source to said objective lens, and
    c) said controller comprises:
       a position calculator for calculating a position of the edge on the basis of an output from said image pickup device;
       a memory for accumulating an output from said position calculator from time $2\pi/\omega$ sec to time $4\pi/\omega$ sec; and
       an AOM controller for controlling said acoustooptic modulator, so that the exposure beam is irradiated at a position obtained by adding a half diameter of the exposure beam to data of the position of the edge accumulated on the memory during an interval from time $2(n+1)\pi/\omega$ sec to time $2(n+2)\pi/\omega$ sec,
       where
          $\omega$: the rotational speed rad/sec of the rotary table,
          $\pi$: the ratio of circumference of circle to its diameter, and
          n: an integer.

13. A method of manufacturing a zone plate, comprising the steps of:
    (a) forming a concentric circular diffraction grating constituted by a plurality of step portions on a surface of a substrate;
    (b) coating a photoresist on the diffraction grating;
    (c) observing, using an image pickup device, an edge of each of the Plurality of step portions on the substrate via the photoresist while rotating the substrate;

(d) calculating a position of the edge on the basis of an output from the image pickup device; and (e) irradiating an exposure beam onto a portion, on a region neighboring the edge position, of the resist while rotating the substrate.

14. A method according to claim 13, further comprising the steps of:

(f) removing a portion of the photoresist from the substrate by dipping the substrate in an organic solvent while applying an ultrasonic wave to the substrate after the step (e); and (g) washing the substrate with water after the step (f).

15. A method according to claim 14, further comprising the step of irradiating Ar ions onto the substrate coated with the photoresist after the step (g).

16. A method according to claim 14, further comprising the step of etching an exposed portion of the substrate by arranging the substrate between opposing electrodes, arranging the substrate in a reactive gas, and applying a high frequency across the electrodes.

17. A method according to claim 16, wherein the reactive gas contains $C_3H_8$.

18. A method according to claim 17, wherein the reactive gas contains $CCl_4$.

19. A method according to claim 14, wherein an exposed portion of the substrate is etched using a reactive ion etching method after the step (g).

20. An apparatus for irradiating an exposure beam emitted by a light source onto a photoresist coated on a substrate, which is placed on a rotary table, via an objective lens, comprising:

(a) a beam expander which is arranged in an optical passage of the exposure beam which propagates from the light source to the objective lens, and expands a diameter of the exposure beam incident thereon; and (b) an element which is arranged in an optical passage of the exposure beam which propagates from said beam expander to the objective lens, and has an aperture with a variable size, the exposure beam passing through the aperture.

21. An apparatus according to claim 20, wherein said element comprises:

a first plate which is movable in a first direction perpendicular to a direction of thickness thereof; and a second plate which is movable in a direction perpendicular to a direction of thickness thereof and the first direction, and the diameter of the exposure beam is limited by said first and second plates.

22. An apparatus according to claim 21, wherein said element further comprises:

a first actuator for moving said first plate; and a second actuator for moving said second plate.

23. An apparatus according to claim 20, wherein said element comprises four plates for defining the aperture, and each of said plates is movable in a direction perpendicular to a direction of thickness thereof.

24. An apparatus according to claim 20, wherein said element comprises:

a substrate having an aperture;

a first plate which is movable in a first direction perpendicular to a direction of thickness thereof, and covers a portion of the aperture of said substrate;

a second plate which crosses on said first plate, is movable in a direction perpendicular to both a direction of thickness thereof and the first direction, and covers a portion of the aperture of said substrate.

25. An apparatus according to claim 20, wherein said element comprises:

a substrate having an aperture;

a first plate which is movable in a first direction perpendicular to d direction of thickness thereof, and covers a portion of the aperture of said substrate;

a second plate which crosses on said first plate, is movable in a second direction perpendicular to both a direction of thickness thereof and the first direction, and covers a portion of the aperture of said substrate;

a first actuator which is fixed to said substrate and moves said first plate; and a second actuator which is fixed to said substrate and moves said second plate.

26. An apparatus according to claim 25, wherein a first guide groove extending in the first direction and a second guide groove extending in the second direction are formed on said substrate, said first plate has a first projection which is slideably fitted in the first guide groove, and said second plate has a second projection which is slideably fitted in the second guide groove.

* * * * *